United States Patent
Scorvo et al.

(10) Patent No.: US 9,032,531 B1
(45) Date of Patent: May 12, 2015

(54) IDENTIFICATION BREACH DETECTION

(71) Applicant: MiddleGate, Inc., Lake Oswego, OR (US)

(72) Inventors: Sean Kristofer Scorvo, Beaverton, OR (US); Edward L. Stull, Brookeville, MD (US)

(73) Assignee: MiddleGate, Inc., Lake Oswego, OR (US)

( * ) Notice: Subject to any disclaimer, the term of this patent is extended or adjusted under 35 U.S.C. 154(b) by 3 days.

(21) Appl. No.: 13/844,750

(22) Filed: Mar. 15, 2013

Related U.S. Application Data

(60) Provisional application No. 61/701,582, filed on Sep. 14, 2012, provisional application No. 61/665,532, filed on Jun. 28, 2012.

(51) Int. Cl.
*H04L 29/06* (2006.01)
*G06F 21/55* (2013.01)

(52) U.S. Cl.
CPC ............ *G06F 21/55* (2013.01); *H04L 63/1433* (2013.01); *H04L 63/1408* (2013.01)

(58) Field of Classification Search
CPC . H04L 63/14; H04L 63/1408; H04L 63/1416; H04L 63/1425; H04L 63/1433
USPC .......................................... 726/22, 23, 24, 25
See application file for complete search history.

(56) References Cited

U.S. PATENT DOCUMENTS

| | | | |
|---|---|---|---|
| 3,914,586 A | 10/1975 | McIntosh | |
| 6,321,338 B1 | 11/2001 | Porras et al. | |
| 6,434,435 B1 | 8/2002 | Tubel et al. | |
| 6,694,301 B1 | 2/2004 | Heckerman et al. | |
| 7,356,843 B1 | 4/2008 | Kingsford | |
| 7,788,200 B2 | 8/2010 | Crivat et al. | |
| 7,805,377 B2 | 9/2010 | Felsher | |
| 7,836,496 B2 | 11/2010 | Chesla et al. | |
| 8,001,607 B2 | 8/2011 | Stull et al. | |
| 8,010,469 B2 | 8/2011 | Kapoor et al. | |
| 8,073,520 B2 | 12/2011 | Kamath et al. | |
| 8,117,049 B2 | 2/2012 | Berkobin et al. | |
| 8,131,922 B2 | 3/2012 | Yagisawa et al. | |
| 2006/0037076 A1* | 2/2006 | Roy ............................. | 726/22 |
| 2013/0006668 A1* | 1/2013 | Van Arkel et al. ................ | 705/3 |

FOREIGN PATENT DOCUMENTS

EP 0898737 3/1999

OTHER PUBLICATIONS 60 minutes. "Medicare Fraud: A $60 Billion Crime," CBS News, Sep. 5, 2010, http://www.cbsnews.com/2102-18560_162-5414390.html.
(Continued)

*Primary Examiner* — Edward Zee
(74) *Attorney, Agent, or Firm* — Law Office of Karen Dana Oster, LLC

(57) ABSTRACT

Systems and methods are disclosed for detecting data breaches and, more specifically, disclosed herein are systems and methods for detecting data breaches and preventing fraud, including healthcare insurance fraud, using both a computer association component (Interpretation model) and a self sensitizing/self de-sensitizing component (SS/SDS model) using a breach observation line (BOL).

15 Claims, 6 Drawing Sheets

(56) References Cited

OTHER PUBLICATIONS

America's Health Insurance Plans. "AHIP Recommendations to Senate Finance Committee on Combating Waste, Fraud, and Abuse in Medicare and Medicaid," Jun. 29, 2012, www.ahip.org/AHIPRecommSFComm06292012.

American National Standards Institute, et al. "The Financial Impact of Breached Protected Health Information: A Business Case for Enhanced PHI Security," Mar. 2012, http://webstore.ansi.org/phi/#.UQg9sL_q30.

Chaput, Bob, and Paloma A. Capanna. "The 2012 HIPAA Audits: Will the Past Predict the Future? Understanding Leads to Best Preparation," Whitepaper, Sep. 2011, http://abouthipaa.com/wp-content/uploads/White-Paper_The-2012-HIPAA-Audits_Will-the-Past-Predict-the-Future_v_FINAL.pdf.

Cramenico, Alicia. "Hospitals to pay $2.3M for alleged Medicaid overbilling, drug profits," Fierce Healthcare, Apr. 20, 2012, http://www.fiercehealthcare.com/story/hospitals-pay-23m-alleged-medicaid-overbilling-drug-profits/2012-04-20.

Department of Health and Human Services. "Medicare Program; Reporting and Returning of Overpayments," 42 CFR Parts 401 and 405; Federal Register, vol. 77, Issue 32, Feb. 16, 2012, http://www.gpo.gov/fdsys/pkg/FR-2012-02-16/pdf/2012-3642.pdf.

Department of Homeland Security. "National Infrastructure Protection Plan," 2009, http://www.dhs.gov/xlibrary/assets/NIPP_Plan.pdf.

Federal Bureau of Investigation. "Historic Medicare Fraud Strike Force Takedown," FBI News Blog, May 2, 2012, http://www.fbi.gov/news/news_blog/strike-force-takedown-050212.

Foster, Hope S., Tracy A. Miner, and Brian P. Dunphy. "The False Claims Act: The Impact in 2012 Part II in a Continuing Series on Health Care Enforcement," 2012, http://www.mintz.com/newsletter/2012/Advisories/1687-0212-FIRM-HCED/1687-0212-FIRM-HCED.pdf.

Messmer, Ellen. "Biggest insider threat? Sys admin gone rogue," Network World, Sep. 27, 2010, http://www.networkworld.com/news/2010/092710-insider-threats.html?ap1=rcb.

McKay, Jim. "Identity Theft Steals Millions from Government Health Programs," GovTech.com, Feb. 12, 2008, http://www.govtech.com/security/Identity-Theft-Steals-Millions-from-Government.html.

Ponemon Institute LLC. "Second Annual Benchmark Study on Patient Privacy & Data Security," Sponsored by ID Experts, Dec. 2011, http://www2.idexpertscorp.com/assets/uploads/PDFs/2011_Ponemon_ID_Experts_Study.pdf.

PricewaterhouseCoopers. "Health industry under-prepared to protect patient privacy; risk of data breaches rise with new access to digital health information, says PwC," Sep. 22, 2011, http://www.prnewswire.com/news-releases/health-industry-under-prepared-to-protect-patient-privacy-risk-of-data-breaches-rise-with-new-access-to-digital-health-information-says-pwc-130338943.html.

PricewaterhouseCoopers Health Research Institute. "Old Data Learns New Tricks: Managing Patient Privacy and Security on a New Data-sharing Playground," PricewaterhouseCoopers, Sep. 2011, http://www.healthcarefinancenews.com/sites/healthcarefinancenews.com/files/resource-media/pdf/old_data_learns_new_tricks.pdf.

Privacy Rights Clearinghouse, at least as early as Jan. 29, 2013, http://www.privacyrights.org/.

Serrano, Richard A. "Doctor charged in nation's largest healthcare fraud scam," Los Angeles Times, Feb. 29, 2012, http://articles.latimes.com/print/2012/feb/29/nation/la-na-medicare-fraud-20120229.

Terry, Ken. "Healthcare industry poorly protecting patient privacy," Fierce Health IT, Sep. 22, 2011, http://www.fiercehealthit.com/story/healthcare-industry-not-protecting-patient-privacy-well/2011-09-22.

Thompson, Don. "Theft of Data on 4M Patients Part of Wider Problem," Yahoo! Finance, Associated Press, Nov. 17, 2011, http://finance.yahoo.com/news/theft-data-4m-patients-part-232412872.html.

Verizon and Secret Service. "2010 Data Breach Investigations Report," Jul. 2010, http://www.verizonbusiness.com/resources/reports/rp_2010-data-breach-report_en_xg.pdf.

Wakefield, Kate. "HIPAA Privacy and Security," 2003, http://www.certconf.org/presentations/2003/Thurs/HM5.pdf.

* cited by examiner

IDENTIFICATION BREACH DETECTION

The present application is an application claiming the benefit of U.S. Provisional Patent Application Ser. No. 61/701,582 filed Sep. 14, 2012. The present application is an application claiming the benefit of U.S. Provisional Patent Application Ser. No. 61/665,532, filed Jun. 28, 2012. The present application is based on and claims priority these applications, the disclosures of which are hereby expressly incorporated herein by reference in their entirety.

BACKGROUND OF THE INVENTION

Disclosed herein are systems and methods for detecting data breaches and, more specifically, disclosed herein are systems and methods for detecting data breaches and preventing fraud, including healthcare insurance fraud, using both a computer association component (Interpretation model) and a self sensitizing/self de-sensitizing component (SS/SDS model) using a breach observation line (BOL).

The term "Critical Infrastructure" is meant to describe societal assets crucial to the function of the society and its economy. The United States Department of Homeland Security lists several critical infrastructure sectors, a few of which are banking and finance, energy, food and agriculture, transportation, and healthcare. Given the importance of data transfer to almost every facet of our day-to-day existence, it is no surprise that the eighteen Sector Specific Plans (circa July, 2012) contained with the Department of Homeland Security's National Infrastructure Protection Plan (NIPP) each have subsections dedicated to the protection of data, and risks posed by misuse of the sector's data. This description focuses on one critical infrastructure sector: healthcare. Healthcare was chosen because of its broad reach into issues ranging from government regulations, commerce, privacy, malware, and, of course, personal healthcare decisions. It should be noted, however, that the disclosed systems and methods are applicable to all critical infrastructure sectors, including all areas of society handling data, regardless of the degree of import of the data to the infrastructure of the country in question.

In 2010 and 2011, there were over 18 million persons affected by Patient Information/Protected Information (PI) breach events (or breaches). Between 2005 and 2008, there were 39.5 million PI breaches at healthcare establishments alone. These breaches have ranged from loss of paper medical records transported in the care of medical personnel between work and home, to theft of millions of electronic medical records from healthcare establishment databases by employees or malicious code. The problem of PI breaches at healthcare establishments has grown with the trend toward implementation of electronic health record systems. A 2011 Ponemon Institute survey reported that 96% of healthcare establishments surveyed had a PI breach during 2010-2011, which is a 32% year-on-year increase in frequency of breaches accompanied by a 10% year-on-year increase in the economic impact of breach. A 2010 Data Breach Investigation Report from Verizon revealed that almost half (48%) of data breaches involved an "insider" and 90% of those breaches occurred with malicious intent.

The driver for the intentional breach is the ability to use a stolen medical record to perpetrate medical fraud. A stolen medical record is worth $50 on the black market, compared to $1 for a stolen social security number. The average amount of financial damage done when a stolen medical record is used to commit medical fraud is $20,000 compared to $2,000 for a stolen financial record. 29% of those involved in a breach suffer some sort of identity theft breach event (a 26% increase from 2010).

Federal agencies are tasked with policing healthcare establishment PI breaches in an attempt to mitigate these trends. The Center for Medicare and Medicaid Services (CMS), an agency within the Department of Health and Human Services, administers the HIPAA (Health Insurance Portability & Accountability Act) and HITECH (Health Information Technology for Economic and Clinical Health) acts that governs how medical records are maintained, transferred, stored, and shared so that the patient's privacy may be maintained under the provisions of the Security and Privacy Rules. Within CMS is the Office of Civil Rights (OCR) that has legal authority to levy fines against covered entities that do not maintain PI privacy under the HIPAA and HITECH Acts. The fine structure was gradated from level A to level D starting in 2009, with the maximum fine levied in level D being $1.5 million: This represented a 6000% increase in the maximum fine. The first fines were levied by OCR under this new system starting in 2011, and, as of February, 2012, have totaled $7.1 million.

The primary monetary damage for a breached entity secondary to a healthcare establishment PI breach is not, however, the fine levied by OCR. The primary damage is, rather, the follow-on class action lawsuit in which damage amounts are considered for the individuals whose records were released in the breach. Damages are decided relative to financial damage, and damage to the released medical record as occurs in cases of medical record fraud subsequent to breach. Emotional damages are not considered, as was recently determined in the US Supreme Court Case Fed. Aviation Admin. v. Cooper, 131 S. Ct. 1441 (2012). Cases where it cannot be proven that damage was done (financial or otherwise) are similarly dismissed as was recently seen in Oregon's Supreme Court when they declined to hear Paul v. Providence Health System-Oregon, on the grounds that there had been no proven damage to the litigants.

However, Paul v. Providence's lack of merit was decided seven years after the breach in question, and the lack of damage was decided primarily on financial grounds. Litigants are now focusing on financial and medical record damage, and litigating much earlier, to take advantage of the period when the damage to breached records is not fully known. In this situation, the average damage value assessed to each record released is $1,000, as is borne out by exemplary cases involving TRICARE and Science Applications International Corporation ($4.19 billion class action suit filed in 2011), and Sutter Health Care ($4.25 billion class action suit). Thus, it is during this time period that the two parties, litigants and defendants, have an interest in either proving or disproving damage due to breached medical records.

Concomitant to the threat posed by the growing healthcare establishment PI breach issue is the problem of healthcare insurance fraud and "Medicare/Medicaid over-billing" (also referred to as "over-billing" or "CMS over-billing"). Medicare fraud is a $60 billion per year crime, and as such it has supplanted cocaine as the primary criminal enterprise in Florida. PwC (PricewaterhouseCoopers LLC) says that 36% of surveyed hospitals and physician groups report incidents of patients seeking services using someone else's name and identification.

Breached medical records are frequently used in the perpetration of fraud, but breached medical records are not a pre-requisite for the perpetration of fraud. Dr. Jaques Roy was indicted in February, 2012 for his central role in a Medicare billing ring that rang up more than $375 million in bogus claims over a five-year period. A May, 2012 indictment of 107 practitioners revealed a Medicare fraud ring responsible for $452 million in false claims.

U.S. Pat. No. 8,073,520 to Kamath et al. describes systems and methods for replacing signal artifacts in a glucose sensor data stream. U.S. Pat. No. 6,321,338 to Porras et al. describes a surveillance system. U.S. Pat. No. 7,836,496 to Chesla et al. describes a system for dynamic network protection. U.S. Pat. No. 8,117,049 to Berkobin et al. describes methods and systems for determining driver behavior. U.S. Pat. No. 8,131,922 to Ennis et al. describes methods and apparatus for the impact of changes in computer networks. U.S. Pat. No. 3,914,586 to McIntosh describes methods and apparatus for data compression. U.S. Pat. No. 8,010,469 to Kapoor et al. describes systems and methods for processing data flows. U.S. Pat. No. 7,356,843 to Kingsford et al. discloses a security incident identification and prioritization system. U.S. Pat. No. 7,805,377 to Felsher et al. discloses an information record infrastructure, system, and method.

BRIEF SUMMARY OF THE INVENTION

Disclosed herein are systems and methods for detecting data breaches and, more specifically, disclosed herein are systems and methods for detecting data breaches and preventing fraud, including healthcare insurance fraud, using both a computer association component (Interpretation model) and a self sensitizing/self de-sensitizing component (SS/SDS model) using a breach observation line (BOL).

The systems and methods described herein enable all types of data-handling establishments, but for the purposes of this example, specifically healthcare establishments, to look for PI breaches in order to avoid costs, rather than react to PI breaches and incur costs. The systems and methods described herein provide a new legal tool for data-handling establishments to demonstrate lack of damage from PI breaches. The systems and methods described herein may provide a potential 71% decrease in class action lawsuit losses resulting from PI breaches that occur from healthcare establishments. The systems and methods described herein potentially provide federal fine mitigation via an audit trail (that may be used to demonstrate a proactive PI breach detection approach to federal investigators). The systems and methods described herein potentially empower data-handling establishments to stop fraud before it affects themselves and insurers (such as CMS) and do it in a manner compliant with Federal regulations (such as EMTALA, HIPAA, and HITECH). The systems and methods described herein potentially enable healthcare specific workflows, as well as workflows in other data-handling establishments/sectors. This solution is directly related to specific human behaviors related to the way PI is used once released, and the type of data-handling establishment/sector it was released from.

The subject matter described herein is particularly pointed out and distinctly claimed in the concluding portion of this specification. Objectives, features, combinations, and advantages described and implied herein will be more readily understood upon consideration of the following detailed description of the invention, taken in conjunction with the accompanying drawings.

BRIEF DESCRIPTION OF THE SEVERAL
VIEWS OF THE DRAWINGS

The accompanying drawings illustrate various exemplary systems and methods.

FIG. 1 is a schematic diagram showing a visual representation of an exemplary multi-domain system demonstrating an exemplary healthcare sector monitoring process, and communications including the Master Patient Index Fingerprints (MPIFs) flowing between five exemplary monitored domains and the correlator and reporter module, with the optional intervening Open Source De-identification Protocol Manager (trusted/verifiable PI-neutralizers) shown between the correlator and reporter module and five monitored domains.

Figure 1:
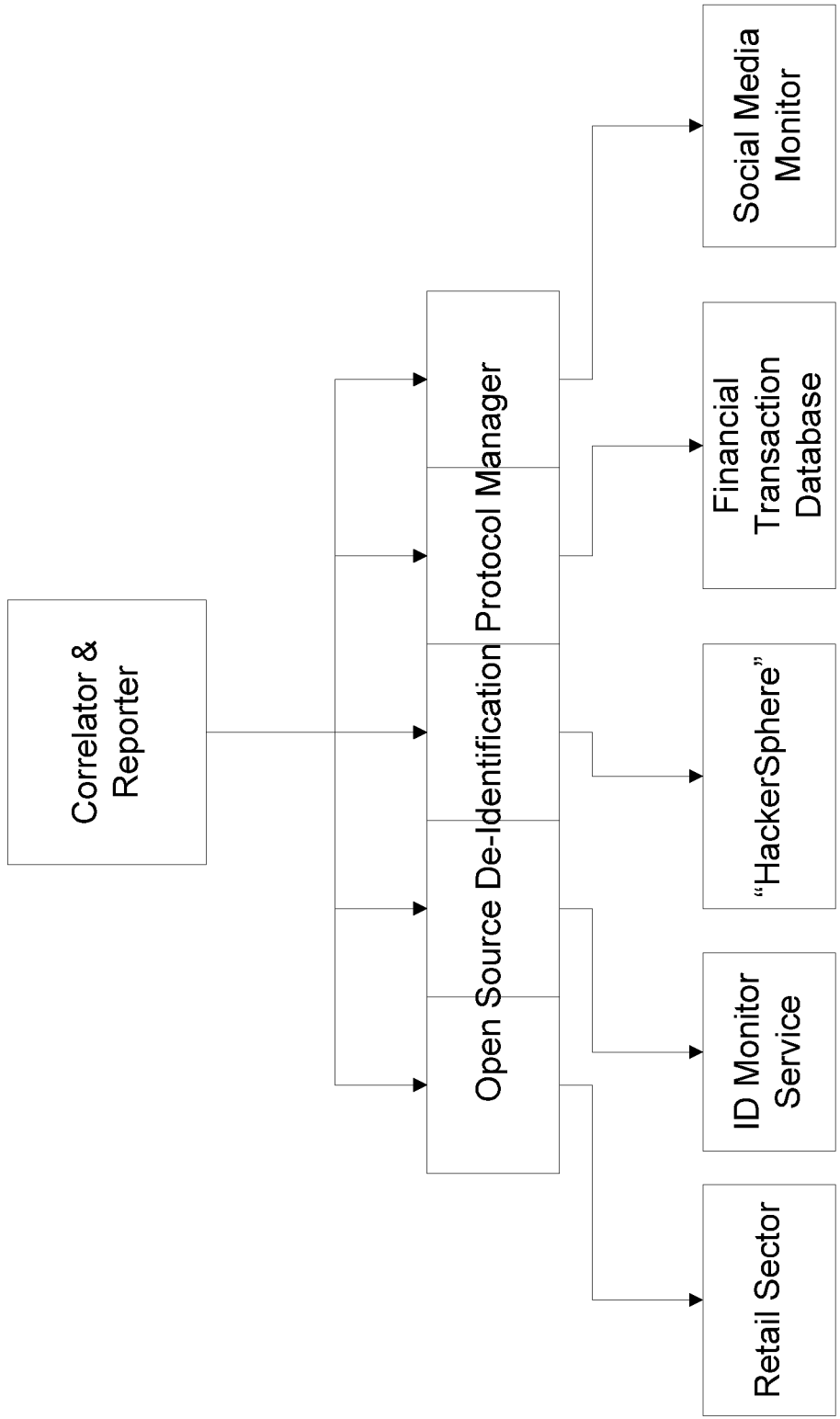

The drawing figures are not necessarily to scale. Certain features or components herein may be shown in somewhat schematic form and some details of conventional elements may not be shown or described in the interest of clarity and conciseness. The drawing figures are hereby incorporated in and constitute a part of this specification.

DETAILED DESCRIPTION OF THE INVENTION

Disclosed herein are systems and methods for detecting data breaches and, more specifically, disclosed herein are systems and methods for detecting data breaches and preventing fraud, including healthcare insurance fraud, using both a computer association component (Interpretation model) and a self sensitizing/self de-sensitizing component (SS/SDS model) using a breach observation line (BOL).

Described herein are systems and methods for detecting data breaches using multiple domain breach event correlations. Using the healthcare sector as an example, the systems and methods are designed to provide early detection of Patient Information (PI) breach and, by way of example, healthcare insurance fraud prevention. The systems and methods monitor multiple domains (e.g. hospital/clinic, hackersphere, CMS data center, ID Monitoring Service (IDMS), and insurance) using a correlator and reporter module. The domains are monitored for "breach events" by measuring the degree of match of a Master Patient Index Fingerprint (MPIF) (that is analogous to the "master protected index fingerprint" (MPIF) in non-healthcare sectors) that corresponds to predetermined data elements (which may be "hashed") of a patient's electronic medical records against records present in the monitored domain. The correlator and reporter module runs a computer association component (Interpretation model), and a self-sensitizing/self de-sensitizing component (SS/SDS model) that uses a breach observation line (BOL). The Interpretation model, ideally, executes the correlator and reporter module's match correlator, probability interpretation, and risk assignment in order to optimize accuracy and forensic capability of the correlator and reporter module. The Interpretation model may execute, and be further aided by, machine intelligence (AI). The Interpretation model may aid in execution of the SS/SDS model and the SS/SDS model's virtual patterning function (and thus, the SS/SDS model may be aided by any AI included in the Interpretation model). When analysis and correlation are completed in the correlator and reporter module, the correlator and reporter module may communicate results to the covered entities and/or to subscribing domain customers via a report.

Exemplary systems and methods may be better understood with reference to the drawings, but these systems and methods are not intended to be of a limiting nature. The same reference numbers will be used throughout the drawings and description in this document to refer to the same or like parts

DEFINITIONS

Before describing the systems and methods, some of the terminology should be clarified. Please note that the terms and phrases may have additional definitions and/or examples throughout the specification. Where otherwise not specifically defined, words, phrases, and acronyms are given their ordinary meaning in the art. The following paragraphs provide some of the definitions for terms and phrases used herein.

Several of the acronyms and abbreviations that are used herein are as follows:
ADT—admission/discharge/transfer;
AI—Artificial Intelligence or technology or systems used to implement artificial intelligence;
BOL—breach observation line;
CE—covered entity (see definition);
CMS—Center for Medicare and Medicaid Services;
CPT—Current Procedural Terminology (codes);
CRM—Content Resource Management;
CSSA—Controlled Substance Seeking Activity (also referred to as "drug seeking behavior");
DEA—Drug Enforcement Administration;
DRG—Diagnosis Related Group;
ED—Emergency Department;
EHR—Electronic Health Record;
FCA—False Claims Act;
HABP—Human Activity and Behavioral Patterns (collection of human behaviors, and patterns of the behaviors, with examples ranging from frequent ED visits as part of pattern of CSSA to identity theft in pursuit of pattern of medical identity fraud);
HICN—Health Insurance Claim Number;
HIPAA—Health Insurance Portability & Accountability Act;
HITECH—Health Information Technology for Economic and Clinical Health;
HL7—HL7 is an exemplary healthcare informatics interoperability (interface) standard set by "Health Level Seven," a non-profit organization formed in 1987, now working with HL7 Version 3 (published in 2005);
ICD—International Class of Disease;
ID—identification;
IDMS—ID Monitoring Service;
IDP—Intrusion Detection & Protection;
MPI—Master Patient Index;
MPIF—Master Patient Index Fingerprint (a combination of all data elements and/or hash codes for all individuals within the MPI);
MRN—Medical Record Number;
NBAD—network behavioral anomaly detection;
NPI—National Provider Identification;
PI—Patient Information/Protected Information;
RoR Sheet—Request or Receive Sheet;
CRM—Customer Relationship Management;
SS/SDS—"self sensitization/self de-sensitization" or "self sensitizing/self de-sensitizing"; and
XRM—Extended Relationship Management (built on CRM platforms, equivalent to Master Patient Index in healthcare establishments).

The term "patient data fingerprint" is used to denote the amalgamation of pulled data elements at the level of the covered entity. The data elements may be "hashed" according to any of a multitude of data obfuscation protocols such as "SHA-2" protocols (256-Bit). Each patient's collection of hashed data elements is amalgamated into a unique "patient data fingerprint," that, in turn, are amalgamated to create a "covered entity's "master patient index fingerprint" (MPIF). In non-healthcare sectors, the "patient data fingerprint" is analogous to the "protected data fingerprint," and the "master patient index fingerprint" is analogous to the "master protected index fingerprint" (MPIF).

The term "sector" is used to describe infrastructure and societal constructs used to facilitate daily human activity. Exemplary sectors include banking and finance, energy, food and agriculture, transportation, and healthcare.

The terms "system" and "method" are used in the description of means for implementing data breach detection. The "system" is generally the physical system and "method" is generally the steps performed by the system. It should be noted, however, that described systems may be implemented as methods and described methods may be implemented as systems. The systems and methods may be implemented using one or more associated modules, subsystems (or submodules), and/or submethods. It should be noted that both systems and methods (and subsystems and submethods thereof) may be implemented using hardware and/or software. The systems and methods described herein may have associated hardware, software, and/or firmware (a variation, subset, or hybrid of hardware and/or software). The term "hardware" includes at least one "processing unit," "processor," "computer," "programmable apparatus," and/or other device capable of executing instructions or steps known or yet to be discovered. The term "software" includes at least one "program," "subprogram," "series of instructions," or hardware instructions or hardware-readable program code known or yet to be discovered. Software may be loaded onto hardware (or firmware) to produce a machine, such that the software executes on the hardware to create structures for implementing the functions described herein. Further, the software may be loaded onto the hardware (or firmware) so as to direct the hardware to function in a particular manner described herein or to perform a series of operational steps as described herein. The phrase "loaded onto the hardware" also includes being loaded into memory associated with or accessible by the hardware. The term "memory" is defined to include any type of hardware (or other technology)-readable media (also referred to as machine-readable storage medium) including, but not limited to attached storage media (e.g. hard disk drives, network disk drives, servers), internal storage media (e.g. RAM, ROM, EPROM, FLASH-EPROM, or any other memory chip or cartridge), removable storage media (e.g. CDs, DVDs, flash drives, memory cards, floppy disks, flexible disks), firmware, and/or other storage media known or yet to be discovered. Depending on its purpose, the memory may be transitory and/or non-transitory. Appropriate "communications," "signals," and/or "transmissions" (that include various types of information and/or instructions including, but not limited to data, commands, bits, symbols, voltages, currents, electromagnetic waves, magnetic fields or particles, optical fields or particles, and/or any combination thereof) over appropriate "communication paths," "transmission paths," and other means for signal transmission (including any type of connection between two elements) would be used as appropriate to facilitate controls and communications.

The phrase "multi-domain system" is a reference to the monitored domains. In addition to the monitored domains, there is a correlator and reporter module associated with the multi-domain system. The monitored domains demonstrated for the healthcare as a critical infrastructure example may include, for example, the hospital/clinic domain, the hackersphere domain, the CMS data center domain, the ID Monitoring Service (IDMS) domain, and/or the insurance domain.

The phrase "correlator and reporter module" refers to the module (that may be implemented using hardware and/or software) that executes a computer association component (Interpretation model) and a self-sensitizing/self de-sensitizing component (SS/SDS model) (using a breach observation line (BOL)). The Interpretation model may facilitate probability interpretation, risk assignment, and match correlation. The Interpretation model may execute, and be further aided by, machine intelligence (AI). The SS/SDS model may execute virtual patterning methods that allow for forensic analysis of breach events. The two models may be executed and correlated within, and their outputs reported from, the "correlator and reporter module."

The phrase "probability interpretation" is directed to a method to reason over propositions that have uncertain "truth" (true/false nature), typically by degree, such as in the statement "50% chance of a coin flip being heads." "Bayesian interpretation" is a specific interpretation of probability and may be used in lieu of, or in combination with other probability interpretations in the Interpretation model described herein.

The phrase "match correlation" indicates the level to which an MPIF matches data found in a domain. If the MPIF matches little or no information in the domain, the match level will be low or zero. Higher match levels are more indicative of a breach. The highest match level correlation would be indicative of a complete match. Match correlations are determined by the match correlator as executed by the correlator and reporter module.

The phrase "risk assignment" is defined as the process of determining and assigning an objective or subjective "risk multiplier" or "risk multiplier number" to MPIF matches that may occur within a "domain." "Risk" denotes perceived or real danger exposure to match levels and all eventual effects from breaches found to have occurred in the domains. Example: Five records found to match the MPIF of a hospital are found in the "Hackersphere" Domain (see Domain #4 description in "Exemplary Systems and methods for Detecting Data Breaches"). "Risk assignment" given to records matching in that Domain is "10" on a scale of 0-10, because records presenting and matching in that domain represent a high risk event to the hospital in question (potential malware on their computer network, potential employee theft of records and sale on black market, potential public relations issues, etc.) so the relatively high "risk assignment" level is applied as a multiplier to the "match level" for a total match level of "50" (5×10=50).

The phrase "virtual patterning" refers to generation of Interpretation model outputs using both real and artificial data inputs in order to produce mock and real Breach Observation Line(s) (BOL) that are stored for later matching against future BOLs, aiding in forensic analysis.

The phrase "forensic analysis" refers to retrospective, scientific analysis of events surrounding an event that may or may not have been criminal in nature. Forensic analysis is specifically focused on the "who," "what," "when," "where," and "how" of a particular event.

The phrase "breach alert analysis" refers to the collection of outputs from the correlator and reporter module as informed by inputs to the correlator and reporter module and the modes therein. The breach alert analysis may be in the form of a report that details the likelihood that a breach has occurred and the measures that the breached data handling establishment and/or healthcare establishment may consider taking.

The word "tuple" denotes an instance of a list of elements, each taken from an invariant ordering of domains.

The word "normalization" (or "normalized") defines the concept of taking disparate items and assigning a common "normal" feature to each as a reference. For example, when comparing items such as a cube, pyramid, and sphere, the normalized value of volume may be used to compare each of the items. In the context of this discussion the disparate measured item requiring normalization is each domain's "breach concern bar" (a function of "risk assignment" and "match level"). The normalization feature chosen to tie and compare each disparate item is variable, and may be (though not limited to) an amplitude of the breach concern bar, a midpoint of the breach concern bar, etc.

The word "vector" defines a one-dimensional (mathematical) object that has an ordered set of elements. By definition, a tuple is a vector, but a vector is not necessarily a tuple. For example, in the context of this discussion, the breach observation lines connecting normalized breach concern bars may be viewed as vectors, each having amplitude, because their associated breach concern bars are normalized, Supplemental Amendment dated Nov. 14, 2014 breach observation line vectors may be added to similarly normalized breach observation line vectors for the purpose of forensic analysis.

The phrase "open source de-identification protocol manager" denotes the use of an optional data obfuscation algorithm manager (shown in the figures as the "open source de-identification protocol manager") that is trusted by all domains to manage/ensure the PI, and any other data, is transmitted is in accordance with HIPAA/HITECH regulations, security requirements, and/or contract requirements. The open source de-identification protocol manager acts as an intermediary between the domains and the correlator and reporter module for receiving/sending MPIFs as they leave the domains in transit to the correlator and reporter module, as well as any data the MPIF match level may correlate with. The correlator and reporter module may be (though not specifically limited to) administered by a trusted business partner, contractor, and/or government agency.

"Breaches," "breach events," and "PI breaches" describe the loss or compromise of control of protected information (e.g. information in medical records or secure databases not meant for exposure to the general public). The loss may be the result of intentional or accidental actions by practitioners (e.g. medical) or someone outside the category of practitioners. Exemplary breaches include, but are not limited to loss of paper records transported in the care of personnel between work and home, theft of millions of electronic records from databases by employees or malicious code, and illegal extraction and fraudulent use of credit card information from a financial services provider database. The phrase "breached entity" is the entity that has its records lost or compromised, The term "damages" refers to financial damages. Damages ideally relate to the actual financial damages incurred when a stolen record is used to commit fraud. Damages have often been expanded to include potential damages because there has been no way to determine the actual damages that might occur in the future. Damages include, for example, fines levied by OCR, follow-on class action lawsuits, malpractice secondary to medical treatments delivered to persons with medical records tainted by fraud, etc.

The phrases "medical practitioner" and "medical personnel" are similar and can be used interchangeably. However, "medical practitioner" is defined primarily as a person who delivers patient care such as a doctor (also referred to herein as a physician or MD), nurse (also referred to herein as an RN), and/or pharmacist. "Medical personnel" is a broader phrase that encompasses traditional medical practitioners and other persons who assist in the optimization of care delivery, coordination of healthcare, payment for healthcare delivery, optimization of healthcare, facilitation of patient entry or exit to or from healthcare facilities, and/or computer systems facilitating any of these healthcare providing activities. Medical personnel, therefore, may refer to, for example, a receptionist, an intake specialist, an orderly, a hospital administrator, an insurance agent, or computer systems related thereto.

The phrase "data-handling establishment" is defined as a physical or virtual location that administers, provides, and/or dispenses services in any way related to maintenance of PI. Exemplary data-handling establishments include, but are not limited to hospitals, financial institutions (e.g. banks), utilities (e.g. electricity suppliers), modes of transportation (e.g. airlines), commercial endeavors (e.g. retail establishments). The term "healthcare establishment," represents one sector of data handling establishments.

The phrase "healthcare establishment" is defined as a physical or virtual location that administers, provides, and/or dispenses medical care, medical advice, care coordination, care payment, care optimization, and/or other services or products associated with medical care. Exemplary healthcare establishments include, but are not limited to hospitals, emergency departments (either associated with a hospital or as an independent facility), clinics, medical offices, pharmacies, insurance provider facilities, Accountable Care Organizations, Coordinated Care Organizations, Health Information Exchange networks, and/or any other physical or virtual location where medical care is administered, provided, coordinated, and/or dispensed either physically or electronically. The terms "hospital," "clinic," and/or "hospital/clinic" are used as synonyms of and/or examples of "healthcare establishments." Healthcare establishments may employ "medical practitioners" and/or "medical personnel."

The phrase "covered entities" (also referred to by the acronym "CEs" (or "CE" for a singular covered entity)) is meant to include any entity that is included under HIPAA and/or HITECH. Exemplary covered entities would include, for example, medical practitioners, medical personnel, and healthcare establishments. A covered entity is any entity required to maintain the confidentiality specified by HIPAA, HITECH, and/or any present or future legislation met to protect confidential records. Thus, by default, a healthcare establishment is a covered entity, but the reverse is not necessarily true. Similarly, medical personnel and medical practitioners are, by default, covered entities, but again, the reverse is not necessarily true.

The term "subscriber" is used to refer to an entity that subscribes to the systems and methods described herein. A subscriber may be a CE or a data-handling establishment.

The word "network" is defined as any collection of computers and other hardware components interconnected by communication channels that allow sharing of resources and information. The phrases "healthcare network" and "internal healthcare network" are defined as a network used in the healthcare sector.

The phrase "controlled substance" is defined as an opioid, benzodiazepine, amphetamine, and/or other Schedule 2 or Schedule 3 substances such as non-benzodiazepine sleep aids. The phrase "controlled substances" includes other sought after drugs or substances available from "medical practitioners" that are known or yet to be discovered. The phrases "drug seeking behavior" and controlled substance seeking activity (CSSA) are meant to include the seeking of any controlled substance for purposes such as personal use/abuse and/or resale (e.g. on the black market).

The term "real-time" is meant to include near real-time.

Descriptions of individual components, systems, subsystems, modules, submodules, and such are meant to include a plurality of the same. For example, although discussed in terms of a singular "open source de-identification protocol manager" and a singular "correlator and reporter module," multiple open source de-identification protocol managers and correlator and reporter modules may be used. Similarly, the functions provided by individual components, systems, subsystems, modules, submodules may be divided among multiple smaller units. Still further multiple or divided components, systems, subsystems, modules, submodules may be combined into fewer components, systems, subsystems, modules, submodules.

When used in relation to signals and/or communications, the terms "provide" and "providing" (and variations thereof) are meant to include standard means of provision including "transmit" and "transmitting," but can also be used for non-traditional provisions as long as the signal and/or communication is "received" (which can also mean obtained). The terms "transmit" and "transmitting" (and variations thereof) are meant to include standard means of transmission, but can also be used for non-traditional transmissions as long as the signal and/or communication is "sent." The terms "receive" and "receiving" (and variations thereof) are meant to include standard means of reception, but can also be used for non-traditional methods of obtaining as long as the signal and/or communication is "obtained." For example, if the "SHA-2 hashed data" is described as being "transmitted" from a hospital to a correlator and reporter module, such "transmission" would also include the hashed data being stored and then "obtained" (fetched) for storage in the correlator and reporter module.

The term "associated" is defined to mean integral or original, retrofitted, attached, connected (including functionally connected), positioned near, and/or accessible by. For example, subsystems associated with hardware and/or software may be implemented by the associated hardware and/or software. Associated subsystems may be functionally associated so as to share and/or exchange information there-between.

Unless specifically stated otherwise, numerical references (e.g. #1, #2, #3, #4, and #5) are meant solely for purposes of designation and not for order or limitation. For example, the numbering of the domains is not meant to represent an order relationship. Similarly, unless specifically stated otherwise, the terms "first," "second," and "third" are meant solely for purposes of designation and not for order or limitation. For example, the first, second, and third purposes of AI have no order relationship. Similarly, it should be noted that relative terms (e.g. primary and secondary) are meant to help in the understanding of the technology and are not meant to limit the scope of the invention. Such relative terms are generally used for purposes of designation and not for order or limitation.

Unless specifically stated otherwise, the term "exemplary" is meant to indicate an example, representative, and/or illustration of a type. The term "exemplary" does not necessarily mean the best or most desired of the type.

Depending on the context, the terms "may," "might," "can," and "could" are used to indicate alternatives and optional features and only should be construed as a limitation if specifically included in the claims. Claims not including a specific limitation should not be construed to include that limitation.

It should be noted that, unless otherwise specified, the term "or" is used in its nonexclusive form (e.g. "A or B" includes A, B, A and B, or any combination thereof, but it would not have to include all of these possibilities). It should be noted that, unless otherwise specified, "and/or" is used similarly (e.g. "A and/or B" includes A, B, A and B, or any combination thereof, but it would not have to include all of these possibilities). It should be noted that, unless otherwise specified, the terms "includes" and "has" mean "comprises" (e.g. a device that includes, has, or comprises A and B contains A and B, but optionally may contain C or additional components other than A and B). It should be noted that, unless otherwise specified, the singular forms "a," "an," and "the" refer to one or more than one, unless the context clearly dictates otherwise.

Systematic Diagrams and Flowcharts

FIGS. 1-5 are systematic diagrams and/or flow charts illustrating systems, methods, modules, subsystems, and/or sub-methods of the systems or methods described herein. It will be understood that each block or element of these figures, components of all or some of the blocks or elements of these figures, and/or combinations of blocks or elements in these figures, may be implemented by software (e.g. coding, software, computer program instructions, software programs, subprograms, or other series of computer-executable or processor-executable instructions), by hardware (e.g. processors, memory), by firmware, and/or a combination of these forms. As an example, in the case of software, computer program instructions (computer-readable program code) may be loaded onto a computer to produce a machine, such that the instructions that execute on the computer create structures for implementing the functions specified in the block(s) or element(s) of the figures. These computer program instructions may also be stored in a memory that can direct a computer to function in a particular manner, such that the instructions stored in the memory produce an article of manufacture including instruction structures that implement the function specified in the figures or element thereof. The computer program instructions may also be loaded onto a computer to cause a series of operational steps to be performed on or by the computer to produce a computer implemented process such that the instructions that execute on the computer provide steps for implementing the functions specified in the block(s) or element(s) of the figures. The phrase "loaded onto a computer" also includes being loaded into the memory of the computer or a memory associated with or accessible by the computer. The term "memory" is defined to include any type of computer (or other technology)-readable media including, but not limited to attached storage media (e.g. hard disk drives, network disk drives, servers), internal storage media (e.g. RAM, ROM), removable storage media (e.g. CDs, DVDs, flash drives, memory cards, floppy disks), and/or other storage media known or yet to be discovered. The term "computer" is meant to include any type of processor, programmable logic device, or other type of programmable apparatus known or yet to be discovered. Accordingly, block(s) or element(s) of the figures support combinations of steps, structures, and/or modules for performing the specified functions. It will also be understood that each block(s) or element(s) of the figures, and combinations of block(s) or element(s) of the figures, may be divided and/or joined with other block(s) or element(s) of the figures without affecting the scope of the invention. This may result, for example, in computer-readable program code being stored in whole on a single memory, or various components of computer-readable program code being stored on more than one memory.

Known Approaches, Problems Associated Therewith, and Proposed Solutions:

It is desirable to coordinate Protected Information (PI) breach prevention with the detection of breached PI in order to most effectively prevent and mitigate damage. It is also desirable to transition from a reactionary approach to fraud to one that is proactive. Using the systems and methods described herein, it is possible to overcome problems with known approaches to the breach detection and fraud prevention problems. The exemplary healthcare sector is described at length herein given the breadth and scope of industry, touching on issues ranging from government regulations, commerce, privacy, malware, and, of course, personal healthcare decisions. The healthcare example exemplifies weaknesses applicable to all critical infrastructure sectors, and, alas, all areas of sectors handling data, regardless of the degree of import of the data to the infrastructure of the country in question.

Industry and government offer no systematic approach for healthcare establishments to identify breaches once they occur, to demonstrate lack of damage from previous breaches, to provide "out of the box" audit tools to prove compliance with HIPAA/HITECH Breach Notification Rules, and/or to alert medical personnel to patterns of fraud before significant economic losses are incurred.

And whereas financial record breaches are monitored carefully via companies such as EQUIFAX®, TRANSUNION®, and EXPERIAN®, claims monitoring, a cumbersome, expensive, and slow means of monitoring medical records, is still the primary means for detecting healthcare insurance fraud. As such, healthcare insurance fraud has traditionally been addressed by forensic analysis and a "stop payment" approach, rather than preventative approaches.

HIPAA/HITECH Compliance "Holes": In the healthcare arena, the systems and methods described herein would provide covered entities the capability to proactively search for PI breaches, CMS over-billing, and insurance fraud in order to avoid costs, rather than react to the same and incur costs. The systems and methods described herein would be, for example, able to identify a PI breach before significant damage is done, then provide the covered entity's legal team the means to demonstrate lack of damage from the PI breach rather than simply award damages based on the assumption that damage would occur. Similarly, a legal team would be able to demonstrate to OCR that a proactive approach was taken to look for breaches, decreasing the likelihood that "Willful Neglect" fines would be levied (45 C.F.R. §160.404). Additionally, the proactive approach would likely blunt the levy of HIPAA Breach Notification Fines that subjectively state that a breached entity should report a breach within 60 days of a point when the breached entity "should have known" of a breach (Section 13402 of the HITECH Act).

The ability to proactively identify PI breaches and then identify PI breach damage would afford the ability to both mitigate damage and disprove damage. This, in turn, would provide a legal team involved in defending a breached entity the necessary proof to show that the breach victims are more likely to be part of the 71% unaffected negatively by breaches, rather than the 29% affected negatively. Given that class action lawsuit damages are generally (in 2012) figured at $1,000 per negatively affected record because damage cannot be disproved, the ability to proactively identify PI breaches and then identify which records are damaged as a result of the breach may decrease damage awards significantly.

It should be similarly noted, however, that the 29% that have been negatively affected by a breach deserve adequate compensation. As such, the exemplary systems and methods described herein would have the ability to illuminate the specific parties deserving of redress, and thus be of benefit to plaintiff's attorneys as well.

The same proactive stance can be assumed by agencies providing outside audits of covered entities (as required under HIPAA/HITECH). 45 CFR 164.308(a)(8) of HIPAA/HITECH mandates periodic review of a covered entity's Policies and Procedures (P&Ps) "in response to environmental or operational changes" to assess extent to which P&Ps still meet the HIPAA/HITECH Information Security and Privacy Rules. Auditing agents provided with evidence of diligence (e.g. a record trail showing proactive search for potentially breached records, proactive search for damage from breached records, and forensic analysis of breached records) and who then review the evidence of diligence, are at a distinct advantage when asked to discern compliance with a pre-existent Policies and Procedures (P&P). According to Clearwater Compliance, LLC, these audits, which had been de rigueur for healthcare, are likely to be mandatory from this point forward:

"The impending 2012 audits [of 150 randomly chosen covered entities] were mandated in a single sentence under Section 13411—'Audits' as part of the ARRA, Pub.L. 111-5, Division A, Title XIII, Subdivision D—'Privacy': 'The Secretary shall provide for periodic audits to ensure that covered entities and business associates that are subject to the requirements of this subtitle and subparts C and E of part 164 of title 45, Code of Federal Regulations, as such provisions are in effect as of the date of enactment of this Act, comply with such requirements.'"

Insurance Fraud Prevention "Holes": Insurance fraud takes many forms from "the use of breached medical records to steal medical care" to "the use of shared medical insurance cards among multiple people." Private insurance and public insurance providers are frequently at a loss to determine patterns of insurance card sharing because of temporal delays in claim submission. Removing of temporal delays, and identifying human travel behaviors in relation to fraudulent seeking of medical care, would make this determination possible.

Stolen and breached medical identities present to healthcare establishments in a number of different ways. A frequently encountered scenario is the use of a stolen identity to seek medical care in association with drug seeking behavior. Ability to watch for specific transactions in relation to a human behavior would have a synergistic effect when associated with other monitored activities.

Finally, in the world of insurance fraud, the responsibility for losses associated with fraud is frequently disputed. Individual victims have difficulty disproving they were not recipients of the care in question. Individual victims are also at pains to have their medical records cleared of information that may have tainted their records. Similarly, insurance providers are at a loss to explain to medical practitioners why they should not be required to pay for insured care. Both the victim and insurance provider, in turn, look to the medical practitioner for the rationale for having provided care to the wrong identity in the first place. Exhibiting care and responsibility for PI at each node (patient, insurer, healthcare establishments) would more easily point out where PI care broke down and who bears responsibility.

The ability to monitor for insurance fraud on all these fronts at once would allow insurers to meet their goals to transition from a "paying and chasing" mode of fraud prevention to a prevention mode.

Traditional Approach to PI Protection: PI protection can be broken down to an internal and external focus. Merging of internal and external threat protection indicates an attempt, at least, at unified threat management.

Internal protection is afforded by Intrusion Detection & Protection (IDP) and Internal Access Control (audit logs and record access limitations preventing inappropriate log-on to, distribution of, and modification of certain records). The IDP focuses on proactive internal protection of electronic information (monitoring for malware placement, Advanced Persistent Threat, etc.). Protection is enhanced when Extrusion Detection protection is added in order to detect information leaving a covered entity in volumes or to places not commonly encountered.

External protection is provided by the likes of Internet "Spiders" Breach Detection Services and Credit Monitoring Services that search out data released from compromised electronic information systems in relation to Human Activity and Behavioral Patterns (HABP).

It should be noted that Artificial Intelligence (AI) is assuming prominence in many of the technology arenas described herein because of AI's ability to conserve processor and server resources as the AI performs the functions of older technology arenas. As such, AI may form the basis for most of the protective approaches described above, from Credit Monitoring Service to IDP.

Internal Protection Shortcomings: Internal healthcare network protection is frequently focused on IDP and Internal Access Control (audit logs and record access limitations preventing inappropriate log-on to, distribution of, and modification of certain records). Neither IDP nor the Internal Access Control, however, focuses on detecting data once it has been released. (NOTE: Extrusion Detection can be viewed as a form of IDP as extrusion detection looks for abnormal electronic data packets leaving a covered entity as a result of malware (e.g. previous intrusion)).

External Protection Shortcomings: Credit Monitoring and Commercial Breach Services are hampered by sensitivity and volume issues. Credit Monitoring Services monitor a person's financial transaction patterns, and then contact the person if his records are being used in a manner inconsistent with previous patterns. The Credit Monitoring Service must therefore monitor HABP (frequently with an underlying AI), and interject with human contact to ascertain intent when previous patterns don't match with present activity. This presents Credit Monitoring Service with two choices: 1) choose high volume of contact with people to ascertain true intent based on AI monitoring outcomes that are discordant with present activity, or 2) choose setting the sensitivity of the AI at such a high level that they miss a number of potentially fraudulent transactions because the attendant service is not alerted to contact the person in question (e.g. setting sensitivity so as to avoid the False Positive Paradox wherein false positives outnumber true positives).

In the healthcare setting, where HIPAA/HITECH privacy laws intercede to prevent the high level of human contact necessary for adequate monitoring, the first choice of whether to contact the person in question is virtually eliminated because Credit Monitoring Service style social intelligence gathering (where social intelligence is defined as the exclusively human ability to navigate and negotiate complex social relationships and environments) is frequently not allowed or palatable in healthcare establishments. This, of course, leaves any potential Monitoring Service with the second choice and its incumbent problem of setting the specificity and sensitivity of the Credit Monitoring Service at such a level as to prevent false negatives with regards to alerting to PI breaches, but not so low as to create situations where false positives outnumber true positives (again, The False Positive Paradox).

Commercial Breach Services, on the other hand, search for the presence of breached records in "hacker" chat rooms and black-market internet sites where records are traded (referred to as searching the "hackersphere"). Commercial Breach Services are likewise not able to contact people in real-time in healthcare establishments so they are automatically shunted to the second choice and its incumbent false positive/false negative problem. Succinctly put, searches of the hackersphere are hampered by the same false positive/false negative (sensitivity and specificity respectively) issues as the Credit Monitoring Services in the healthcare arena. Additionally, when the Commercial Breach Services find records in the hackersphere, there are many questions apart from those surrounding sensitivity and specificity. How many records connote a breach? What mixture of records connotes a breach? The records searched for by the Commercial Breach Services are common to multiple databases, so couldn't the records have come from any of the common databases?

Exemplary Systems and Methods for Detecting Data Breaches:

Described herein are exemplary systems and exemplary methods for enabling data-handling establishments and healthcare establishments to correct the breach detection and fraud prevention shortcomings outlined herein. Specifically, disclosed herein are systems and methods for detecting data breaches using multiple domain breach event correlations. The preferred systems and methods use a computer association component (Interpretation model) and/or a self-sensitizing/self de-sensitizing component (SS/SDS model) (using a breach observation line (BOL)). The Interpretation model may facilitate probability interpretation, risk assignment, and match correlation. The Interpretation model may execute, and be further aided by, machine intelligence (AI). The SS/SDS model may execute virtual patterning methods where the virtual patterning methods allow for forensic analysis of breach events. The two models are executed and correlated within, and their outputs reported from, the "correlator and reporter module."

The exemplary systems and methods achieve the outlined goals by sharing information between the Interpretation model and a self-sensitizing/self de-sensitizing (SS/SDS) component referred to as the SS/SDS model. The SS/SDS model may replace the HABP model used by Breach Detection Services and Credit Monitoring Services while avoiding the sensitivity and specificity pitfalls inherent to avoidance of the HABP model. The SS/SDS model sets its own level of sensitivity for the detection of breaches in response to variable inputs so as to prevent false positives (erroneously alerting for a PI breach that has not occurred) while simultaneously retaining sufficient system specificity so as to prevent false negatives (erroneously failing to alert for a PI breach that has occurred). Additionally, the SS/SDS model may execute virtual patterning methods within the correlator and reporter module and (potentially aided by AI executed within the Interpretation model) may optimize accuracy and forensic capability of the correlator and reporter module.

Externally focused Credit Monitoring Services and Breach Detection Services use HABP, but they are not legally allowed to apply social intelligence encompassed in their HABP approaches because of the privacy restrictions introduced in the healthcare arena. Thus, external healthcare network protection is forced to abandon HABP in the healthcare arena. Credit Monitoring Services and Breach Detection Services not in the healthcare arena may also choose to forego the HABP approach for business or social acceptability reasons. To date there have been no solutions that address the subsequent problem of false positives and false negatives that accompany that HABP abandonment.

What is needed are systems and methods with abilities to fill the void left by the IDP/Internal Access Control/Hacker focus on PI Breach, while addressing the shortcomings of today's externally focused Credit Monitoring Services and Breach Detection Services. The combination of an Interpretation model and a SS/SDS model serving as a functional replacement for HABP and as a solution to the sensitivity/specificity conundrum facing Credit Monitoring Services and Breach Detection Services today, while most pressingly applicable to healthcare, may also prove functional in several other business arenas.

An exemplary system and an exemplary method enabling the desired functionality are described in the following overview.

Overview (Healthcare Establishment Example):

On a pre-determined schedule (e.g. by time units such as daily or weekly, by the occurrence of certain events such as the end of a shift, or at random intervals), the systems and methods described herein "pull" a plurality (e.g. twenty) of pre-determined demographic data elements associated with each patient in a covered entity's "Master Patient Index" (MPI) (noting again that a covered entity can be a healthcare establishment of any sort, an individual medical practitioner, or medical personnel in charge of patient records, etc.). The pulled data elements may be "hashed" at the level of the covered entity according to data obfuscation protocols such as "SHA-2" protocols (256-Bit). Each patient's collection of hashed data elements is amalgamated into a unique "patient data fingerprint." The systems and methods described herein collect the patient data fingerprints to create a "Master Patient Index Fingerprint" (MPIF) unique to the covered entity in question, on the day in question. This is described further in relation to Task 1.

The systems and methods described herein may create subdirectories of "Shared Master Patient Indexes" detailing records that are shared with affiliated covered entities that, in this case, would commonly be affiliated clinics, Accountable Care Organizations, Coordinated Care Organizations, Health Information Exchanges, etc. such that breaches from affiliated organizations can also be detected. The subdirectories would be used as equivalents of MPIFs that are shared with affiliated organizations, forming the basis for the SS/SDS and interpretation models executed in the correlator and reporter module.

For added security and confidentiality, as shown in FIG. 1, the preferred systems and methods may use at least one intermediary (e.g. an open source de-identification protocol manager) between the monitored domains and the correlator and reporter module. For example, each MPIF and/or shared MPIF may be "pushed" to the "open source de-identification protocol manager" via the secure web-service portal. The open source de-identification protocol manager ensures that only de-identified PI is pushed to the correlator and reporter module by pushing only hashed information (the preferred embodiment of information) or portions of data elements unidentifiable as PI. Using this method, the correlator and reporter module, preferably, have no access to the covered entity's or other domain's PI (or any other demographic information) in an identifiable form. Further, each monitored "domain" may include multiple covered entities, business partners, and/or subscribers. For example, the hospital/clinic domain may include multiple hospitals and/or clinics, the insurance domain may include multiple insurance companies, and/or any domain may include an open source de-identification protocol manager. Similarly, although five domains are pictured in FIG. 1, multiple domains are possible, each with different subscriber bases, business specialties, and/or data breach vulnerabilities that can lend value to and partake of the Interpretation model and SS/SOS model.

Data elements and/or hashed information other than the demographic information of patients of covered entities may be attached to individual patient data fingerprints from specialized domains including, but not limited to: the ID Monitor Service domain; the hackersphere domain; the Center for Medicare and Medicaid Services (CMS) Database domain; and the Insurance Database domain. Information from the ID Monitor Service domain may include: Was the ID stolen?; Was the ID part of previous breach?; Was the ID part of a paid ID monitoring service?; and Was the ID on a watch list from affiliated insurance provider for fraud? Information from the hackersphere domain may include: Is the patient data being sold in criminal manner?; Where is the patient data being sold?; and What was the intent of the patient data posting (profit, anarchy, etc)? Information from the CMS Database domain and the Insurance Database domain may include: How many claims were filed for the hospital/clinic in question?; What was the dollar amount of claims filed for the hospital/clinic in question?; How many claims were filed for individual practitioners within the hospital/clinic in question?; What was the dollar amount of claims filed for individual practitioners within the hospital/clinic in question?; How many claims were filed for individual patient data fingerprints within the hospital/clinic in question?; What was the dollar amount of claims filed for individual patient data fingerprints within the hospital/clinic in question?; and What DRGs were attached to individual patient data fingerprints for the hospital/clinic in question?

The following describes the tasks, interface, and overall data structure of the systems and methods described herein.

The phrase "multi-domain system" is a reference to the monitored domains (shown as five, but there is no limit to the number of domains). In addition to the monitored domains, there is a correlator and reporter module associated with the multi-domain system. These five monitored domains include the hospital/clinic domain, the hackersphere domain, the CMS data center domain (Medicare and Medicaid), the ID Monitoring Service (IDMS) domain, and the private insurance domain.

Actuation of the multi-domain systems and methods is preferably preceded by one primary task and two optional tasks at the point hospital/clinic installation. These tasks are described in the sections entitled "Establish Hospital/Medical Provider Clinic/ID Monitoring Service Master Patient Index Fingerprint (MPIF)" (Task 1); "Establish Web-Browser Questionnaire Interface or Electronic Health Record (EHR) Interface To Determine Controlled Substance Seeking Activity (CSSA)" (Task 2); and "Establish Real-Time Link To Patient Registration System" (Task 3).

The relative benefits and prior art informing each domain of the system, and intersecting data-flows of each domain are described in each "domain."

Task 1: Establish Hospital/Medical Provider Clinic/ID Monitoring Service Master Patient Index Fingerprint (MPIF).

Task 1 is a primary task (not optional).

MPIF established by collecting any or all of the following distinct data elements that are preferably found within each patient's electronic medical record file, any of which may be "hashed" (e.g. applying SHA-2 coding, other SHA algorithm, or other data obfuscation algorithm):

First Name;
Middle Name;
Last Name;
Date of Birth (xx/yy/zzzz);
Medical Record Number (MRN);
SSN/Tax ID number;
ZIP Code of primary address;
Date of service for claim;
DRG (Diagnostic Related Group) for claim;
CPT (Current Procedural Terminology) for claim;
Provider's DEA number;
Medicare Claim control number;
Health Insurance Claim control number;
Insurance Plan Name;
Insurance ID number;

Primary Care "Medicare National Provider Identification" (NPI) number;
Facility NPI number;
Other NPI numbers associated with Patient;
Primary Medical Practitioner First and Last Name; and/or
Other Medical Practitioner(s) First and Last Name.
The combination of all data elements and/or hashed (e.g. SHA-2) codes for each data element represents the hash for one individual.
The combination of all data elements and hashes for all individuals within the MPI makes up the MPIF for the covered entity.
The MPIF for the covered entity is sent to correlator and reporter module for correlation to the other five domains to be described herein. The frequency of the MPIF upload to correlator and reporter module is determined by a covered entity based on the level of security desired. (Older MPIFs are archived for forensic analysis if there is breach event.)
The number of positive correlations to an MPIF ("match level") in any of the five domains generates the strength of the correlation to a breach or other matching algorithms described herein.
The following patents describe exemplary suitable hashing:
U.S. Pat. No. 4,295,124 to Roybal—Communication method and system—one of earliest descriptions of hashing;
U.S. Pat. No. 5,371,499 to Graybill et al.—Data compression using hashing—describes a more sophisticated method of how to hash; and
U.S. Pat. No. 4,588,985 to Carter et al.—Polynomial hashing—alternative hashing method.
The following patents describe exemplary suitable database searching and matching:
U.S. Pat. No. 7,814,070 to Kaminski—surrogate hashing—surrogate hashing for the purposes of database matching as described in patent;
U.S. Pat. No. 4,503,514 to Urquhart—compact high speed hashed array for dictionary storage and lookup—hashed array vector matching; and
U.S. Pat. No. 6,988,124 to Douceur et al.—locating potentially identical objects across multiple computers based on stochastic partitioning of workloads—stochastic workload partitioning Task 2: Establish Web-Browser Questionnaire Interface and/or Electronic Health Record (EHR) Interface To Determine Controlled Substance Seeking Activity (CSSA) (AKA Drug Seeking Behavior).
This task is optional and may serve to improve the accuracy of breach alerts for covered entities.
CSSA tracking is exemplary of HABP monitoring within the confines of Federal regulations (related to "Domain #1"; see below).
Exemplary web-browser questionnaire interface:
Hospital/clinic staff will include on each patient's chart a paper insert (RoR Sheet" (Request or Receive Sheet)) with the following question (for ALL patients 18 and over): "On this visit, did the patient request or receive a prescription for or administration of a controlled substance? y/n."
At the end of shift (or with workflow to be determined at each facility) the RoR Sheet will be collected and the "y/n" answer entered for the corresponding patient listed on the web browser window for the facility.
Each web browser window will be populated by the HL7 web-services interface (or other healthcare informatics interoperability (interface) standard) with the patient registration system in place.
Each patient visit is kept "open" until it is "closed" by answering the "y/n" question from the medical practitioner's questionnaire.
The closure of each patient's visit establishes the patient's Controlled Substance Seeking Activity ("CSSA").
Options for manual closure of patient visit include, for example, a machine-readable testing paper (e.g. a SCANTRON®) or the inclusion the aforementioned questionnaire on an already installed "Electronic Health Record" (EHR).
Exemplary EHR Interface:
For ALL patients 18 and over, an HL7 Interface (or other healthcare informatics interoperability (interface) standard) gathering information on:
patient's presenting complaint, presenting symptoms
pain related (y/n)
request for or receipt of controlled substance (y/n)
The advantage of the EHR interface over questionnaire approach is that it allows the entire system to be automated, negating need for extra steps in the collection of HABP.
One disadvantage of the EHR interface over the questionnaire approach is that it relies on the EHR questions to eschew the nuance of social intelligence in determining a person's motivation at presentation to a hospital/clinic. For example, drug-seeking behavior as it relates to a "request" for controlled substances can be subtle and may require human intuition. Elimination of a question monitoring the intent of patient as determined by staff interacting with a person and recorded as a "yes" when asked if the person requested a controlled substance is less specific (higher false negative rate) than an EHR simply recording the number of pain related symptoms/complaints.

Task 3: Establish Real-Time Link To Patient Registration System;
This task is optional and may serve to improve the accuracy of breach alerts for covered entities
For patients presenting to a hospital/clinic covered entity, an HL7 interface (or other healthcare informatics interoperability (interface) standard) may be set up to gather any or all of the following information from the patient registration system on patient ADT data such as:
First Name;
Middle Name;
Last Name;
Date of Birth (xx/yy/zzzz);
Medical Record Number (MRN);
SSN/Tax ID number;
ZIP Code of primary address;
Date of service for claim;
Provider's DEA number;
Medicare Claim control number;
Health Insurance Claim control number;
Insurance Plan Name;
Insurance ID number;
Primary Care "Medicare National Provider Identification" (NPI) number;

Facility NPI number;
Other NPI numbers associated with Patient;
Primary Medical Practitioner First and Last Name; and/or
Other Medical Practitioner First and Last Name.
Data may be hashed as set forth in "Task 1."
Data elements and/or hashed ADT data is matched to ID Monitoring Service domain as described in "Domain #4" description below.
"Task 3" establishes "newness" to MPI by comparing ADT information to MPI, but Domain #1 may function without "Task 3."

The primary and optional tasks now complete, the multi-domain system will be described in relation to the shown exemplary domains: Domain #1 being the hospital/clinic monitored domain; Domain #2 being the hackersphere monitored domain; Domain #3 being the CMS data center monitored domain; Domain #4 being the ID Monitoring Service (IDMS) monitored domain; Domain #5 being the insurance monitored domain; and Domain #6 being the correlator and reporter module. Each of these domains may be implemented as a solitary subsystem or submethod, combined with other domains such that a single subsystem implements multiple domains, or divided into multiple subsystems or submethods. Each domain may consist of multiple "members" or "partners" (e.g. see FIG. 1). For example, the hospital/clinic domain may contain several unaffiliated covered entities and the open source de-identification protocol manger may be one manager or several trusted/verifiable PI identifier neutralizers.

Domain #1: Hospital/Clinic:
Breached PI records can present again in the hospital/clinic of origin (after illicit purchase), as well as outside hospitals/clinics; Domain #1 tracks this movement of breached PI records, combining movement of PI with HABP where possible. Domain #1 then measures breach potential by combining "intra-hospital/clinic" measurements with "extra-hospital/clinic" measurements. The intra-hospital/clinic Breach Alert measurement alerts to breached PI records coming back into a hospital/clinic (covered entity) after a breach. The extra-hospital/clinic Breach Alert measurement alerts to breached PI records coming into a hospital/clinic (covered entity) from an outside covered entity and/or breached PI records from one's own hospital/clinic presenting at an outside covered entity (e.g. a hospital/clinic other than one's own).

The following steps may be used to implement and use the intra-hospital/clinic breach alert:
Step 1: See "Task 1," "Task 2," and "Task 3" to establish MPI (also termed Master Patient Index, XRM, CRM) and patient registration links. Task 2 and Task 3 are optional.
Step 2: Determine baseline ratio of patients in MPI to the number of patients from the MPI seen in the hospital/clinic on average according to following exemplary algorithm:
NOTE: the proposed exemplary algorithm will preferably use Standard Deviations (Std. Dev.) that are given specific values. The values described herein are for demonstration purposes only. In practice, the values may be variable as the sensitivity and specificity of the system is varied over time by the SS/SDS model, and the Interpretation model run within the correlator and reporter module.
Ascertain if the patient being seen is "new" (i.e. not in the MPI) or "old" (i.e. previously seen in the MPI, or simply being updated from the MPI) by matching the patient registration to the MPI on file. ("Task 2" may expedite the systems and methods, but it is not necessary to determine if record is new to MPI, hence "Task 2" is labeled as an optional task).
If the patient being seen is new to the MPI, it is counted as "NEW."
If the patient being seen is old/updated from the MPI, it is counted as "OLD."
Noting that the total number of MPI records becomes the denominator in the following ratio: "OLD"/"MPI."
If "OLD"/"MPI"=>2 standard deviations from the mean, then the following ratio is calculated: "OLD"/"MPI"/"CSSA" where "CSSA" is defined as controlled substance seeking behavior (as determined in "Task 2").
Step 3: Determine if the ratio increases beyond the SS/SDS model "trigger points," where trigger points are varied according to sensitivity/specificity inputs from the SS/SDS model, and risk assignment from the Interpretation model. For example, as an AI mode run within the Interpretation model learns to ascribe greater risk (risk assignment) to intra-hospital MPIF ratio increases because of correlation with breach, fraud, etc. in the forensic analysis afforded by the virtual patterning run within the SS/SDS model, the Interpretation model may lower the match level necessary to trigger an intra-hospital breach alert. Alternatively, as an AI mode run within the Interpretation model learns to increase sensitivity informing the SS/SDS model, the trigger points may further decrease the match level necessary to trigger an intra-hospital breach alert.
If "OLD"/"MPI"/"CSSA"=>2 standard deviations from than the mean, then "POTENTIAL INTRA-HOSPITAL BREACH ALERT" is flagged.
If the hospital/clinic foregoes "Task 2" and "CSSA" determination is not possible, "POTENTIAL INTRA-HOSPITAL BREACH ALERT" may still be flagged, but the SS/SDS model may modify the sensitivity accordingly and accuracy of alert output from correlator and reporter module may decrease.

Example of "POTENTIAL INTRA-HOSPITAL BREACH ALERT":
"If there are 1,000,000 patients in the MPI, and 60,000 of them visit the ED in any one year (5,000/month) . . . a ratio of 60,000:1,000,000 (or 0.06).
Suddenly, 5,500 of the MPI patients show up in a month, equating to 66,000:1,000,000 (or 0.066) (that, when compared statistically with the hospital/clinic mean, represents a greater than 2 standard deviation change).
This may or may not be significant, so it should be determined whether there was a concomitant increase in CSSA to indicate that the breached records were sold on the street and immediately used to get drugs.
If there is an increase in the CSSA for the facility, the significance hurdle is crossed . . . in this example, if there is normally a CSSA rate of 30% for a facility, the number is 60,000:1,000,000:0.30 (or 0.18) . . . . However, if there is a breach, CSSA might increase to 33% for a facility, leading to a number of 66,000: 1,000,000:0.33 (or 0.2178).

The following steps may be used to implement and use the extra-hospital/clinic breach alert:
  Step 1: See "Task 1," "Task 2," and "Task 3" to establish MPI and registration links.
  Step 2: Determine distance person's primary address is from hospital/clinic in question by ZIP Code and the frequency that ZIP Code is normally treated in the hospital/clinic service catchment area.
    NOTE: the proposed exemplary algorithm will use Standard Deviations (Std. Dev.) that are given specific values . . . these values are for demonstration purposes only. In practice, values may be variable as the sensitivity and specificity of the system is varied over time by the SS/SDS model, Interpretation model, and remainder of the correlator and reporter module.
    HL7 web-services interface (or other healthcare informatics interoperability (interface) standard) queries the patient registration system
    ZIP Codes for all visitors to hospital/clinic are compiled
    Visitor ZIP Codes analyzed for distance of hospital/clinic from visitor primary address as a function of radius from hospital/clinic in question (e.g. looking for =>2 standard deviations from the mean)—for example, 5 miles, 10 miles, 20 miles, 50 miles, 100 miles, 1000 miles, and 2500 miles.
    Variance from the mean geographic radius, may induce the correlator and reporter module to evaluate for ZIP Code variance, allowing for smoothing of variability that might be seen between hospitals in a metro particularly prone to conventioneers (e.g. downtown Las Vegas) vs. hospitals on the outskirts of the same city that might not be.
  Step 3: Determine if the ratio increases beyond SS/SDS set trigger points. The SS/SDS model may vary the set trigger points depending on input from the remainder of the correlator and reporter module and its inherent Interpretation model.
    If Observing for =>2 standard deviations from the mean for any particular zip code(s):
      If there is =>2 standard deviations from the mean, the system will observe for correlation with the CSSA activity.
      If there is =>2 standard deviations of zip code activity: CSSA ratio in a hospital/clinic, then a "POTENTIAL EXTRA-HOSPITAL BREACH ALERT" is flagged
      If hospital/clinic foregoes "Task 2" and "CSSA" determination is not possible, "POTENTIAL EXTRA-HOSPITAL BREACH ALERT" may still be flagged, but the SS/SDS model may modify the sensitivity accordingly, and accuracy of alert output from correlator and reporter module may decrease.
The following steps may be used to integrate the intra-hospital/clinic breach alert and extra-hospital/clinic breach alert:
  "POTENTIAL EXTRA-HOSPITAL BREACH ALERT" and "POTENTIAL INTRA-HOSPITAL BREACH ALERT" are combined in the correlator and reporter module to generate a "breach concern bar" (see FIG. 9).
    Amplitude of the breach concern bar may be influenced by the Interpretation model (using the match correlator), probability interpretation, and risk assignment to the findings in Domain #1) and the SS/SDS model (executing virtual patterning) executed in the correlator and reporter module.
    Amplitude of the breach concern bar may vary according to the frequency of the correlator and reporter preparing the breach alert analysis, that, in turn, may vary according to the frequency of access to MPI, CSSA, and ADT data as outlined in Tasks 1, 2, & 3.
Domain #2: "Hackersphere": Breached PI records presenting in chat rooms, hacker rooms, and black market purchase sites represent various mixtures of breach types secondary to malicious code (e.g. computer viruses) ranging from breaches with no goal of monetary gain, criminal breaches where monetary gain is the end goal, and breaches where anarchy and discord are the goals. Thus, monitoring of Domain #2 where records are posted for sale or malicious use after having been pilfered from open system portals, etc. may be especially helpful in determining whether malware was installed unbeknownst to the system operator. The form of monitoring and subsequent detection allows for system securitization, whereas, without Domain #2 monitoring, portals and subsequent pilfering may continue unabated.
The following steps may be used to implement and use the Hackersphere (Domain #2):
  Step 1: Web Spiders (also known as Web Crawlers) are available as commercial off the shelf products to retrieve specified information from various websites, "chatrooms," "hacker-sites," etc. and return the data to the correlator and reporter module (see FIG. 1).
    The "spiders" are able to interpret various data structures and free text so as to extract applicable information.
    Based on the interpretation above, the "spiders" are able to determine the match level of the discovered data according to their individual data elements and/or data obfuscation (e.g. hashing) protocols such as SHA protocols as described in "Task 1."
    Hashing specified data may ensure that the correlator and reporter module is not a repository for sensitive data acquired from websites and may be chosen by specific "spiders".
    The data may transit (pass through) the Open Source Data De-Identifying Protocol Manager (as it is electronically transmitted from the domain to the correlator and reporter module) for trusted de-identification if and as required by Domains for PI de-identification validation (see FIG. 1).
  Step 2: If the correlator and reporter module detects a match level with a stored MPIF from Domain #1 archives, information including, but not limited to, the following may be correlated with the match level:
    Chat room moniker of the person(s) posting the matched PI;
    Date/time/IP address of the post site from the matched PI;
    Characteristics of the PI post site such as whether it is a(n):
      Anarchist site;
      Black market site; and/or
      Hacker site.
  Step 3:
    Amplitude of the breach concern bar may be influenced by the Interpretation model (using the match correlator), probability interpretation, and risk assignment to the findings in Domain #2) and the SS/SDS model (executing virtual patterning) executed in the correlator and reporter module.

Amplitude of the breach concern bar may vary according to the frequency of the correlator and reporter preparing the breach alert analysis that, in turn, may vary according to the frequency of access to data elements and/or hashed data in Domain #2.

Domain #3: "CMS Data Center": Breached PI records fall into the hands of criminals who then use the PI records to file false claims with Medicare and Medicaid. The false claims transit (pass through) Center for Medicare/Medicaid Services (CMS) data centers where they are processed. The MPIF can be monitored at the data centers according to the protocols discussed herein, and transmitted to the correlator and reporting module for correlation with the MPIF of other domains.

The systems and methods used to monitor for PI breach by accessing Domain #3 also allows for determination of covered entity fraud (e.g. medical practitioner fraud) as providers and hospitals/clinics billing above normal levels in terms of frequency and amount compared to peer organizations/providers would normally trigger an audit if they were to be part of the x % of records audited by CMS annually. Claims transiting this domain may be compared against comparable institutions/providers by geography/specialty/age group treated/DRGs/frequency for the claim to call attention to outliers.

The following steps may be used to implement and use the CMS Data Center (Domain #3):

Step 1: Claims at CMS data centers are evaluated for any or all of the following data elements as described herein.
  First Name;
  Middle Name;
  Last Name;
  Date of Birth (xx/yy/zzzz);
  Medical Record Number (MRN);
  SSN/Tax ID number;
  ZIP Code of primary address;
  Date of service for claim;
  Provider's DEA number;
  Medicare Claim control number;
  Health Insurance Claim control number;
  Insurance Plan Name;
  Insurance ID number;
  Primary Care "Medicare National Provider Identification" (NPI) number;
  Facility NPI number;
  Other NPI numbers associated with Patient;
  Primary Medical Practitioner First and Last Name; and/or
  Other Medical Practitioner First and Last Name.

Step 2: The data elements may remain intact, or they may be hashed (using data obfuscation protocols such as SHA-2 protocols) and transmitted electronically (possibly via secure web service protocols) to an open source de-identification protocol manager for trusted/verifiable PI-neutralization.

Step 3: The data elements/hashes are preferably transmitted electronically (possibly via secure web service protocols) to the correlator and reporter module.

Step 4: The correlator and reporter module may detect a positive match level with a stored MPIF from the Domain #1 archives in the following manner(s):
  Match level correlations with any of the following additional data element matches;
  Facility Medicare number match;
  Provider Medicare number match;
  MRN match.
  NOTE: In this way, installation in a hospital/clinic externally monitors physicians affiliated with the hospital/clinic whose patients have been treated at the hospital/clinic at any time in the past. In so doing, the hospital/clinic has the ability to monitor its affiliated medical practitioners and the PI in the medical practitioners' care even if the patients are not seen at the hospital/clinic in present tense; Essentially affording an external monitoring capacity. External monitoring provides practitioner fraud monitoring of affiliated medical practitioners, medical personnel, and/or organizations.

Step 5: A positive match is followed by a download from CMS of any or all of the following exemplary information:
  Number of claims for patient;
  Number of claims per facility;
  Number of claims per provider;
  DRG per patient;
  DRG per facility;
  DRG per provider;
  CPT per patient;
  CPT per facility;
  CPT per provider;
  Dollar amount per claim per patient;
  Dollar amount per claim per facility; and/or
  Dollar amount per claim per provider.

Step 6:
  Amplitude of the breach concern bar may be influenced by the Interpretation model (using the match correlator), probability interpretation, and risk assignment to the findings in Domain #3) and the SS/SDS model (executing virtual patterning) executed in the correlator and reporter module.
  Amplitude of the breach concern bar may vary according to the frequency of the correlator and reporter preparing the breach alert analysis that, in turn, may vary according to the frequency of access to data elements and/or hashed data in Domain #3.

Domain #4: "ID Monitoring Service" (IDMS): ID Monitoring Services keep on file and monitor those identities of persons (subscribers to the IDMS) who were victims of previous breach or ID theft events or who want their ID monitored to prevent ID misuse. Those records, however, are typically only monitored for evidence of financial activity discordant with previous history (indicative of identity theft). Domain #4 permits real-time monitoring of the MPIF equivalent in the IDMS and alerts the IDMS when one of their subscriber(s) presents for treatment in Domain #1, a claim is made in Domain #3, and/or a claim is made in Domain #5 as correlated in the correlator and reporter module.

The IDMS is able to alert its subscriber(s) to the presence of the subscriber's record being used (in real-time) in the possible commission of medical fraud. Similarly, the correlator and reporter module is able to alert the affected domains as to the patient data fingerprint correlation made in real-time. This early alert makes it possible for the affected Domain covered entity to prevent healthcare fraud and its resultant financial and/or medical record damage from occurring in relation to the event in question. If the IDMS subscriber is indeed in the facility in question, and the patient data fingerprint correlation is not representative of healthcare fraud, the affected Domain covered entity may be instructed by the correlator and reporter module as to how to disregard the contact from the IDMS. If, however, the IDMS subscriber is not in the facility in question, the affected IDMS subscriber and Domain #4 may be instructed by the correlator and reporter module as to how to contact the affected Domain covered entity to inform the Domain covered entity that the IDMS subscriber ID is being used in the commission of an identity theft and/or healthcare fraud crime.

The following steps may be used to implement and use the ID Monitoring Service (IDMS) Domain (Domain #4):

Step 1: IDMS Subscriber's patient data fingerprints at IDMS data centers are evaluated for any or all of the following data elements as described herein.
  First Name;
  Middle Name;
  Last Name;
  Date of Birth (xx/yy/zzzz);
  SSN/Tax ID number;
  ZIP Code of primary address;
  Insurance Plan Name; and/or
  Insurance ID number.

Step 2: The patient data fingerprints data elements, which may be hashed per data obfuscation protocols such as SHA-2 protocols, are transmitted electronically (possibly via secure web service protocols) to an open source de-identification protocol manager for trusted/verifiable PI-neutralization.

Step 3: The patient data fingerprint is amalgamated as a master patient index fingerprint (MPIF) and transmitted electronically (possibly via secure web service protocols) to the correlator and reporter module.

Step 4: The correlator and reporter module detects possible positive match levels with stored MPIF from Domain #1 archives and/or patient registration according to "Task 2."

Step 5: Positive matches (as determined by the correlator and reporter module) are reported to the IDMS and the affected Domain encountering the patient data fingerprint (ID) in question in any of a multitude of messaging techniques (facsimile, telephone, computer messaging, mail, etc.) with instructions regarding how to verify the identity of the owner of the patient data fingerprint in question (e.g. the patient). Ideally, however, the correlator and reporter module alerts a person at the IDMS with instructions regarding how to contact their subscriber so that the IDMS may:
  Verify in real-time whether the patient who "owns" the patient data fingerprint in question is in, or filed a claim with, the Domain in question.
  Provide instructions to the Domain in question regarding how to proceed if the patient who "owns" the patient data fingerprint in question is not in, or has not filed a claim with, the Domain in question.

Step 6:
  The correlator and reporter module generates a breach concern bar for positive matches within the IDMS Domain. Amplitude of the breach concern bar may be influenced by the Interpretation model (using the match correlator) probability interpretation, and risk assignment to the findings in Domain #4) and the SS/SDS model (executing virtual patterning) executed in the correlator and reporter module.
  Amplitude of the breach concern bar may vary according to the frequency of the correlator and reporter preparing the breach alert analysis that, in turn, may vary according to the frequency of access to data elements and/or hashed data in Domain #4.

Domain #5: "Insurance": Breached PI records fall into the hands of criminals who then use them to file false claims with Private Insurers. Non-breached records also may find themselves used in the commission of healthcare fraud as is the case in medical insurance card sharing. In both cases, insurance claims transit data centers called Insurance Clearinghouses (IC) and/or go directly to the data centers of the Insurers themselves (the Insurance Payers or IP) for claims processing. For the purpose of description and not limitation, the data centers are referred to as one amalgamated data center: The IC/IP.

The MPIF of Domain #5 can be monitored at the IC/IP according to the protocols discussed herein, and transmitted to the correlator and reporter module for correlation with the MPIF of other domains. The systems and methods used to monitor for PI breach by accessing Domain #5 also allows for determination of covered entity fraud (e.g. medical practitioner fraud) as medical personnel and hospitals/clinics billing above normal rates (in terms of frequency and amount compared to peer organizations/medical personnel) would normally trigger an audit if they were to be part of the x % of records audited by CMS annually. Claims transiting this domain will be compared against comparable institutions/medical personnel by geography/specialty/age group treated/DRGs/frequency for the claim to call attention to outliers.

Additionally, as private insurance is especially prone to the issue of healthcare insurance card sharing in order to obtain healthcare benefits for which one has not paid, special consideration is given in this domain for uncovering card sharing. It should be noted that the card sharing fraud detection described herein might also be applied to Domain #3.

The following steps may be used to implement and use the Insurance (IC/IP) Data Center (Domain #4):

Step 1: Claims at IC/IP data centers are evaluated for any or all of the following data elements as described herein.
  First Name;
  Middle Name;
  Last Name;
  Date of Birth (xx/yy/zzzz);
  Medical Record Number (MRN);
  SSN/Tax ID number;
  ZIP Code of primary address;
  Date of service for claim;
  Provider's DEA number;
  Medicare Claim control number;
  Health Insurance Claim control number;
  Insurance Plan Name;
  Insurance ID number;
  Primary Care "Medicare National Provider Identification" (NPI) number;
  Facility NPI number;
  Other NPI numbers associated with Patient;
  Primary Medical Practitioner First and Last Name; and/or
  Other Medical Practitioner First and Last Name.

Step 2: The data elements, which may be hashed using data obfuscation protocols such as SHA-2 protocols, are transmitted electronically (possibly via secure web service protocols) to open a source de-identification protocol manager for trusted/verifiable PI-neutralization.

Step 3: The data elements are is transmitted electronically (possibly via secure web service protocols) to the correlator and reporter module.

Step 4: The correlator and reporter module may detect a positive match level with stored MPIF from Domain #1 archives in the following manner(s):

Match level correlations with any of the following additional data element matches;
Insurance Plan Name match; and/or
Insurance Plan ID number match.

NOTE: In this way, installation in a hospital/clinic is monitoring physicians affiliated with a hospital/clinic whose patients have been treated at the hospital/clinic at any time in the past. In so doing, the hospital/clinic has the ability to monitor its affiliated medical practitioners and the PI in the medical practitioners' care even if they are not seen at the hospital/clinic. This, therefore, provides practitioner fraud monitoring of affiliated medical practitioners, medical personnel, and organizations.

Step 5: A positive Match is followed by download from IC/IP of any or all of the following exemplary information:
Number of claims for patient;
Number of claims per facility;
Number of claims per provider;
DRG per patient;
DRG per facility;
DRG per provider;
CPT per patient;
CPT per facility;
CPT per provider;
Dollar amount per claim per patient;
Dollar amount per claim per facility; and/or
Dollar amount per claim per provider.

Step 6: The correlator and reporter module generates a breach concern bar for positive matches within the Insurance Domain. Amplitude of the breach concern bar may be influenced by the Interpretation model (executing match correlation (using the match correlator), probability interpretation, and risk assignment to the findings in Domain #5) and the SS/SDS model (executing virtual patterning) executed in the correlator and reporter module.

Private insurance is especially concerned with the issue of healthcare insurance card sharing induced healthcare fraud necessitating correlator and reporter module analysis regarding:
Geographic spacing of visits;
Temporal spacing of visits; and/or
Association of visits with CSSA (drug seeking behavior).

Correlations indicating card sharing may be reported in real-time by the correlator and reporter module to Domain #5 with instructions regarding how to contact their subscriber so that the IDMS may verify in real-time whether the patient who "owns" the patient data fingerprint in question is in the Domain #1 covered entity seeking medical treatment, or filed a claim with the Domain #5 covered entity in question.

Amplitude of the breach concern bar may vary according to the frequency of the correlator and reporter preparing the breach alert analysis that, in turn, may vary according to the frequency of access to data elements and/or hashed data in Domain #5.

Figure 4:
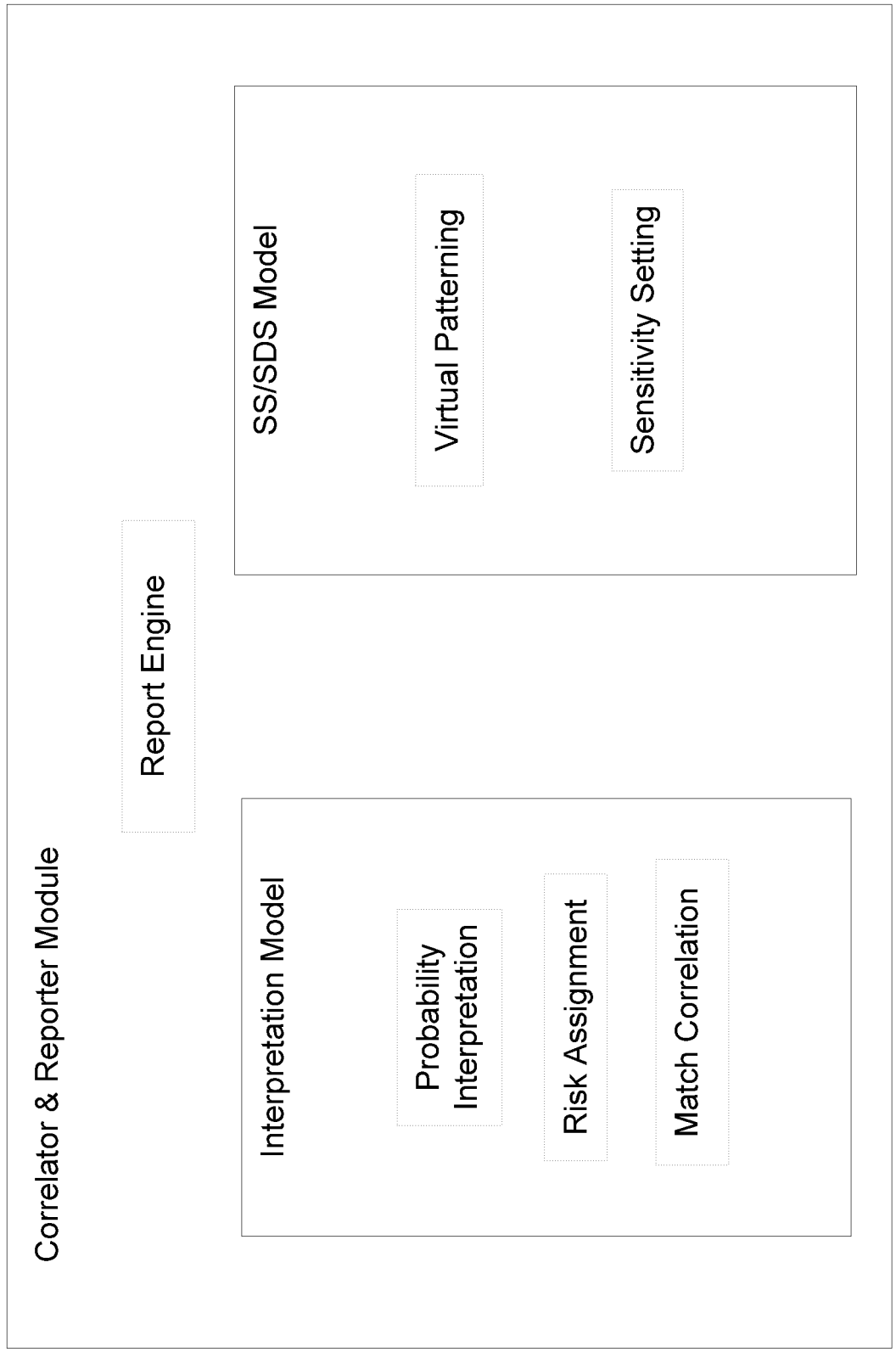
FIG. 4 is a schematic diagram showing that within the correlator and reporter module, two models (the Interpretation model and the SS/SDS model) are, ideally, run, and those two models, in turn, run subroutines that optimize their individual outputs.
Figure 5:
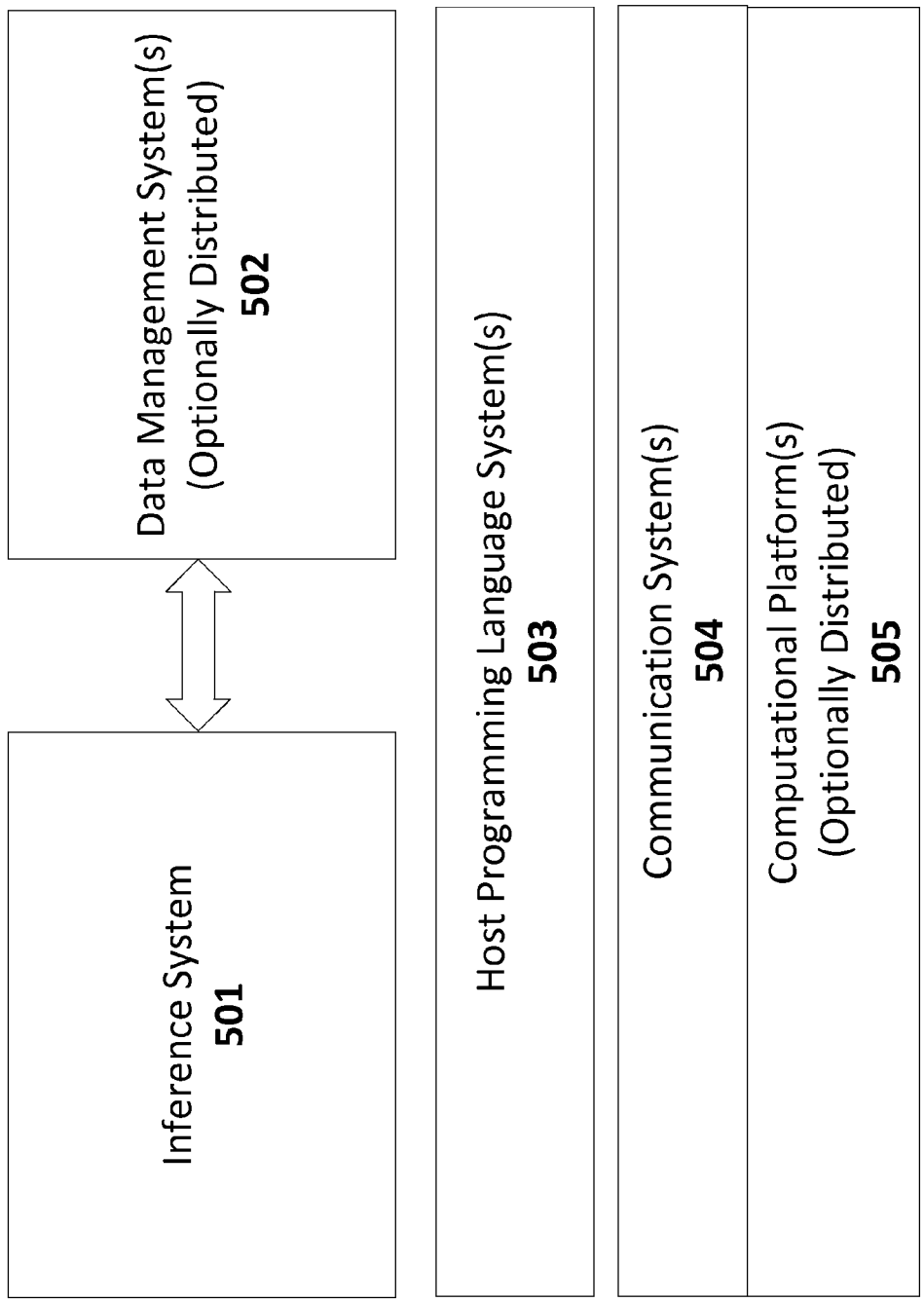
FIG. 5 is a schematic diagram showing a high-level architecture of the major support components to the two highest level components: Inference Engine and Database.

Domain #6: "Correlator and reporter module": Patient data fingerprints, MPIFs, and shared master patient indexes are archived so that the correlation between Domains #1-#5 can be centrally processed (after receipt from the optional Open Source De-Identification Protocol Manager transit site), and so that virtual patterning of breaches can be forensically analyzed (see FIG. 1). As shown in FIG. 4, the correlator and reporter module preferably executes an Interpretation model that, in turn, preferably executes a match correlation, probability interpretation, and risk assignment model implemented in hardware and/or software (see FIG. 4). The correlator and reporter module preferably executes an SS/SDS model in parallel/conjunction with the Interpretation model (see FIG. 4), where the SS/SDS model generates virtual breach concern bars indicating the significance of findings in each monitored domain (see FIG. 2) while adjusting sensitivity and specificity in response to Interpretation model inputs.

Figure 3:
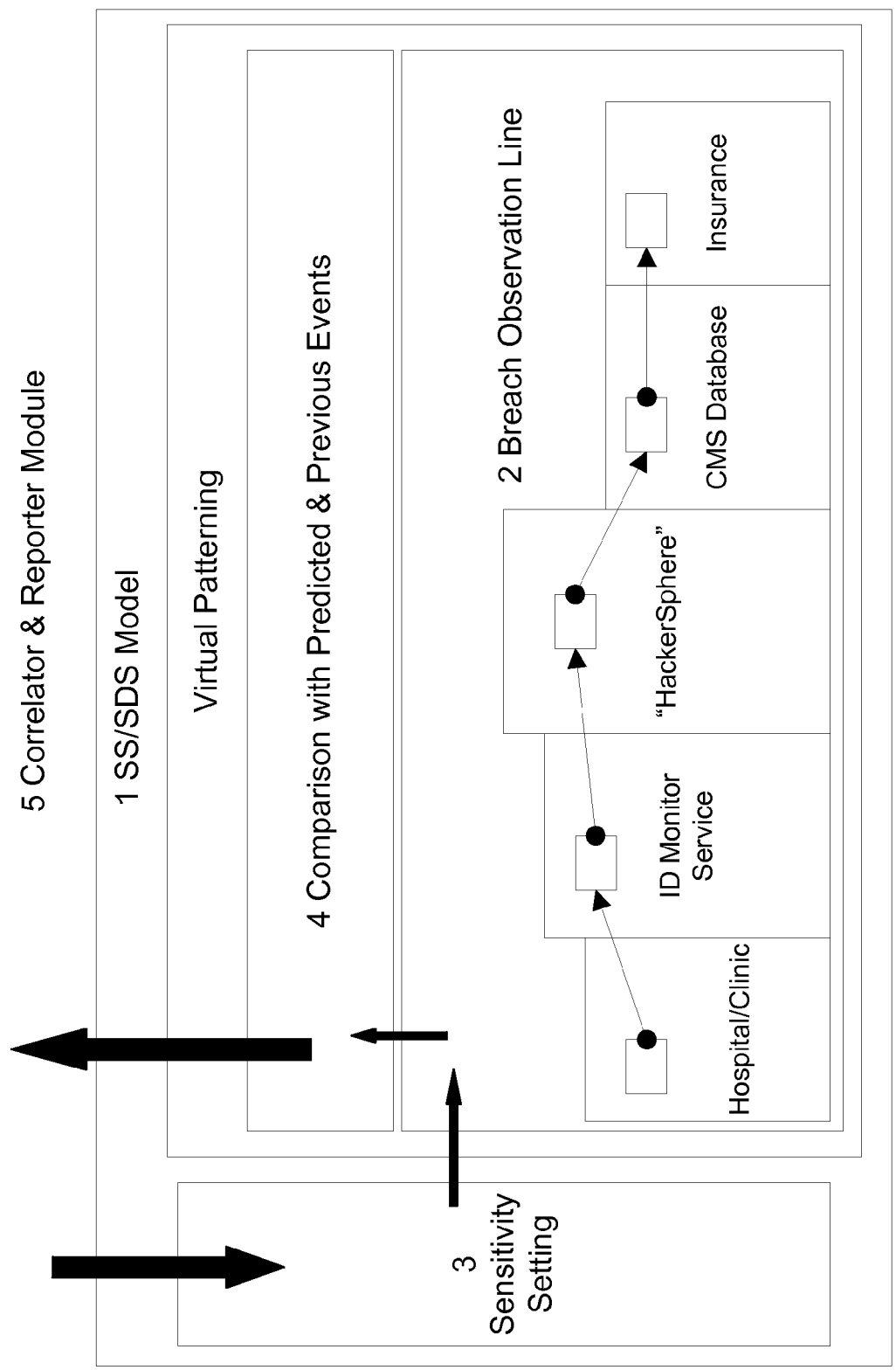
FIG. 3 is a schematic diagram showing that a correlation of the breach observation line is performed with predicted and previous events to determine whether alert and fraud reporting should be performed.

As shown in FIG. 3, connection of the breach concern bars with a virtual line at the normalized mid-point of the breach concern bar, (though any normalized measure, normalized point in space, normalized mathematically derived value, etc. is acceptable) allows for creation of a virtual "Breach Observation Line" in the SS/SDS model's virtual patterning subroutine. The breach observation line, in turn, graphically illustrates the SS/SDS model's capabilities of the correlator and reporter module.

It should be understood, however, that the virtual patterning output (shown as a segmented line and represented by the number "4" of FIG. 3) is a graphic demonstration of the tuple, normalization, and vector concepts of the described exemplary systems and methods for detecting data breaches (illustrated in number "2" of FIG. 3). A digital/mathematical representation of the breach observation line is sufficient for the virtual patterning subroutine of the SS/SDS model to make forensic comparisons to future digital/mathematical representations of breach observation lines so long as the tuple concept is inherent to the digital/mathematical representation. For example, in FIG. 3 (illustrated in number "2"), a tuple is represented by the invariant ordering of the domains, normalization is represented by the choice of the midpoint of the breach concern bar as a feature common to domains of disparate qualities and amplitudes (as determined in FIG. 2), and the vector is represented by the linking of the breach concern bars at the normalized points in a manner reflective of the domain's qualities and amplitudes. However, in a digital/mathematical representation of the breach observation line in FIG. 3, normalization is not necessary, and a tuple is also a vector (though a vector is not necessarily a tuple) by definition. As such, though the breach observation lines are graphically illustrated in FIG. 3 for the purpose of this example, and the breach observation lines require the concepts of tuple, normalization, and vector, the graphically represented breach observation lines are meant to be a representation of the digital/mathematical tuple over the domains for each breach concern bar.

The breach observation line graphically illustrates the correlation of various domains, allowing one to conceptualize, and the Interpretation model to make inferences regarding, the significance of the amplitude of the breach concern bar of any one domain. Alternatively stated, any breach concern bar on its own has marginal significance: One might legitimately ask whether the MPIF matched in that domain because the PI was common to other databases (among a multitude of other questions)? It is only by connecting the breach concern bars graphically/digitally that the significance of breach concern bars for individual domains can be understood. Alternatively viewed, one might legitimately ask the following question: "Couldn't the MPIF information found in one of the monitored domains have shown up there because it was breached from another database that happened to share some of the same people?" It is only by correlating findings in one domain with findings in other domains that one may answer such a question with reasonable certainty. For instance, it is conceivable that information showing up in the Hackersphere (see FIG. 1) could present there from a breached database from either a retailer or a hospital/clinic that happens to serve the same clientele because of geography. When information from the other domains and the manners in which the information is used are taken into account, however, it can be ascertained whether the breach was at the hospital/clinic or the retailer.

The breach observation line and its correlation to "real" events, in turn, allows for comparison to archived breach observation lines (graphically, or digitally) so that feedback regarding true positives, false positives, true negatives, and false negatives may inform the Interpretation model and improve probability interpretation. This, in turn, informs the sensitivity and specificity settings of the SS/SDS model and the accuracy of future SS/SDS model's breach concern bars. This prevents incidents such as the False Positive Paradox (where false positives outnumber true positives alerted to by systems and methods). This, in turn, informs future breach observation lines that then informs the Interpretation model again.

The virtual patterning of the SS/SDS model also provides a forensic capability in that it allows for input of virtual data/scenarios and evaluation of the resultant breach observation line. For example, one may input data presupposed for a scenario (a real-life historical example or a hypothetical example) where PI breach results from a disgruntled employee that steals one million PI records, sells the data to an organized crime syndicate with a history of Medicare fraud and physically located in an area with a high incidence of prescription drug abuse. The resultant breach observation line would be archived to inform forensic analysis of future "real" breach observation lines.

Prior art informing the Interpretation model includes Artificial Intelligence techniques such as machine learning and iterative learning. Examples of such techniques include, but are not limited to, expert systems, case based reasoning, probability interpretations, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

U.S. Pat. No. 8,131,717 to Page—Scoring documents intelligently selected from a database—a correlation engine selecting events of possible interest to the human.

U.S. Pat. No. 8,112,367 to George, et al.—Episodic memory with a hierarchical temporal memory based system—correlates over time to perform machine learning, perhaps with human input, but does not replace the human interaction.

U.S. Pat. No. 8,135,657 to Kapoor, et al—System and methods for processing data flows—self organized mapping.

U.S. Pat. No. 6,078,901 to Ching—Quantitative supply and demand model based on infinite spreadsheet—an attempt to merge computer modeling with the unpredictability of human behavior, though no specific human behaviors are monitored, rather, an infinite number of potential behaviors (referred to as "social science" inputs) are taken into account, as are an infinite number of potential "physical science" inputs).

U.S. Pat. No. 5,274,737 to Shinoda—Reference pattern adapting device trainable by a small number of training patterns.

Prior art informing the match level (match correlation) (see FIG. 4) of the Interpretation model includes U.S. Pat. No. 7,814,070 to Kaminski—Surrogate hashing—surrogate hashing for the purposes of database matching as described in patent.

U.S. Pat. No. 4,503,514 to Urquhart—Compact high speed hashed array for dictionary storage and lookup—hashed array vector matching.

U.S. Pat. No. 6,988,124 to Douceur, et al.—Locating potentially identical objects across multiple computers based on stochastic partitioning of workloads—stochastic workload partitioning.

The final output of the correlator and reporter module is reports, recommendations, feedback, forensic analysis regarding type of breach, and/or fraud encountered based on execution of the Interpretation model and SS/SDS model. Reports are generated in the correlator and reporter module's "report engine" (see FIG. 4), and returned to the affected domain. Depending on the Domain affected, the reports might be real-time. Reports are generated for each domain per each domain's parameters/needs. One exemplary reporting method that can be used is described in U.S. Pat. No. 8,156,553 to Church, et al. The Church reference describes systems and methods for correlating log messages into actionable security incidents and managing human responses—a method for taking discordant alert messages and synthesizing the information with regulations in effect in the institution (such as HIPAA) to generate an output (such as an alert).

Logic Programming Techniques

One embodiment of this invention is a system that is based on logic programming techniques. Supporting these techniques are other techniques which provide general computing services such as data storage and communications. An important note about this embodiment is that once the data store (or data stores if distributed) is queried and loaded into the memory of the host computing environment (or environments if the computing host is also distributed), a behavior is manifested by operating on the data in embodiment's memory using logic programming techniques.

As opposed to traditional computing that generates behavior by pre-programmed code likely accessing data, in this embodiment, the data includes rules of behavior that interact not only with data but also other rules, all governed by the support services of the logic programming environment. Typically, but not necessarily, for approaches such as this embodiment, the logic programming services cause the contents of the data stores to appear as if they are completely loaded in memory.

The resulting behavior of this embodiment is to facilitate a machine or machines to independently without human intervention: reason about breach and fraud problems to solve; reason about how to solve those problems and produce their solutions; then reason about how to interact with users regarding the problem solutions. This behavior must also include analysis of historical trends and their supporting data as well as recognition of the changes in state due to the advent of new data as well as data updates while generating all the behavior to monitor many tens of millions of entities of interest such as patients for healthcare or account holders in financial services and insurance.

Although the embodiment is comprised of many components that are prior art, it is the combined interaction of these components as governed by the rules, explicitly or implicitly, described in the data that manifests the method and resulting behavior of this invention.

A. B. Major Components of the Embodiment

Figure 6:
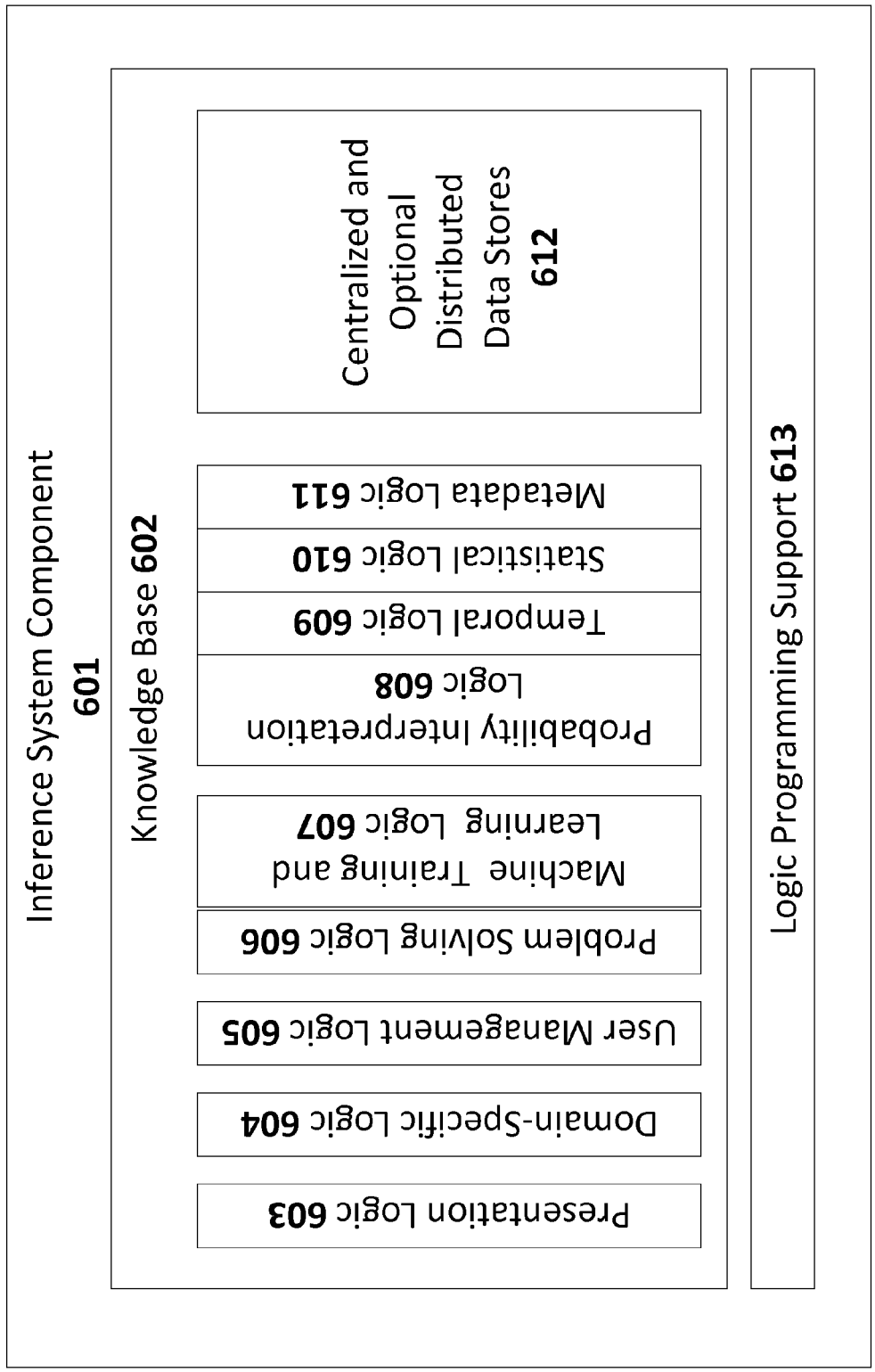
FIG. 6 is a schematic diagram showing the interference system component and associated knowledge base, presentation logic, domain-specific logic, user management logic, problem solving logic, machine training and learning logic, probability interpretation logic, temporal logic, statistical logic, metadata logic, centralized optional distributed data stores, and logic programming support.

FIGS. 6 and 7 depict the components of the embodiment in terms of their service contribution to the behavior described above and as described below.

FIG. 6 depicts the major components of the embodiment. The top layer is comprised of an Inference System 601 and a Data Management System 602 to persistently store the data in use. The remaining layers 603—604 provide the necessary computational support including communications, both internally to the components and externally to users.

FIG. 7 details the Inference System 601 of FIG. 6.

The Data Management System(s) 602 component provides the ability to persistently store data that at some point in the data's lifecycle is loaded into the embodiment's memory for analysis. Of particular note here is that the data further includes rules that describe the means to reason about the data as well as other rules. Due to the behavior required for this invention, the data management system of the embodiment may need to manage trillions of data items as well as having these data distributed over a large number of separate and disparate data stores wherein all data stores must operate concurrently with the other data stores. Further, it is possible that the data management system is comprised of a variety of different data management technologies, providing the technologies involved have an effective means to communicate and share data as required.

Host Programming Language System(s) 603 component provides the necessary logic to invoke and communicate among the components that are respectively written in one or more of the programming languages. In most cases, each programming language will have its own support environment which in turn may need to communicate with the other programming language support environments. Two candidate programming languages for this embodiment are Java and Prolog, both of which have many commercial and open source libraries that are rich in the features needed, in addition to their standard support environments. In combination, these support environments provide the needed low-level functionality for the embodiment's components.

Communication System(s) 604 component is the means for the components to communicate with each other as well as the users of the system. Likely more than one communication system will be necessary, for example, one communication system will provide communications over the internet while another may provide a high performance channel between distribute computing hosts while still another may be provide specialized communication to user devices.

The Computational Platform(s) 605 components may be comprised of one or more computational platform providing there is a means to communicate and share data as required. Indeed, if the data management system is comprised of one or more data stores and possibly more than one technology, it is also possible that workloads may be distributed also among these data store sites as well as still other sites. However ideally, the host programming language component 603 and communication system component 604 will have sufficient functionality so as to cause the distributed environment to appear like a single abstract computing host to the inference system component 601.

The Inference System Component 701 (also depicted in 601) is comprised of two high level components: the Knowledge Base 702 and the Logic Programming Support 713. Using the common analogy of the record player, the knowledge base may be perceived as the record, or better the data, while the logic programming support may be perceived as the record player, or better the computing host. Whereas, the model difference for this embodiment is that the record can be modified by the record player as instructed by the record.

The Knowledge Base component 702 as describe earlier is comprised of both rules of behavior and data. However, it is typically the case that what is often data in traditional computing may be considered a rule also in the knowledge base, thus such data can inherit behavior properties from other rules additionally. Ideally, this aspect can provide a uniform model for the embodiment's knowledge base. Accordingly, the rules prevail over all of the behavior manifested by the knowledge base, thus the rules represent the method with its data context that produces the resulting behavior of this invention. Note also that rules can also generate other rules as well as alter existing rules. This is especially true for machine learning (see 707).

So as to have a means to persist the knowledge base, the centralized or distributed data stores 712 persist elements of the knowledge base in such a manner as to enable effective reloading of the data into the memory of this embodiment. These data stores are managed respectively by one or more data management systems 602, each of which will likely require nearly all of the support services offered by traditional relational and graph-oriented database management systems.

Given the rules as described above, the Logic Programming Support 713 provides the base functionality to perform the inference mechanisms that interpret the rules. Ideally, the logic programming support will provide as a minimum both forward and backward chaining support. Although higher order logic systems exist, first-order logic support systems such as available in Prolog are generally sufficient for this embodiment.

To cover the broad functionality required, the rules of behavior may be categorized minimally into:
  (a) The Presentation Logic 703—provides logic for interaction with human users. This may be done through broad range of presentations systems such as 3D graphical interaction in computer-simulated environments, simple interrogative and response messages or through composite displays of widgets, with likely customizable views, representing both the user input to and the output from the embodiment. Ideally the presentation logic will produce dynamic displays that adjust to needs for representation of a problem solution as well as presenting the current state of the embodiment while also offering one or more means for the user to respond to or input to the embodiment.
  (b) Domain-Specific Logic 704—provides logic about the domain of discourse to be supported by the embodiment.

In this invention, although other domains are possible, healthcare is addressed specifically as one possible domain. Thus, for example, it is this logic component that describes through rules the knowledge needed regarding healthcare. Note that more than one domain can be described in the knowledge base, but if so, additional rules may likely be required to avoid ambiguous behavior of the embodiment. In this respect, the method of this invention is integrated with one or more domains of discourse.

(c) User Management Logic 705—provides logic that describes the users of this embodiment such that the behavior can interact with its users, either machine or human. Ideally, models for interaction with users will be described initially then altered over time through the machine learning logic 707.

(d) Problem Solving Logic 706—provides the means for this embodiment to independently, that is without human interaction, reason about the breach and fraud problems to solve, how to solve those problems and produce their solutions, then how to interact with users regarding the problem solutions and likely resolve which means are best for the method of this invention to discover the best solution. The machine learning logic will, over time, lead to the most suitable and reliable solutions by assisting human users in understanding the problems of interest as well as possibly interacting with the users so as to improve their environments. Much of the embodiment's machine-based reasoning will likely be driven by goal-reduction logic, otherwise known as backward-chaining or goal-seeking logic.

(e) Machine Training and Learning Logic 707—provides the logic for the means for the embodiment to learn from its operation as well as from it users. There are a large number of possible technologies that will satisfy the needs of this logic subsystem. Initially, this embodiment relies on supervised training and learning so as to form its initial knowledge base. However, this subsystem must also have, or otherwise through some means acquire, the knowledge to learn without supervision. This logic system may also self-train by finding a means to reproduce behavior that matches evidence that it discovers in the knowledge base. Such behavior is needed due to the very large knowledge base that is possible. Thus, an essential part of the embodiment's learning will be to identify what the embodiment needs to learn as well as to reason about how to accomplish that learning. Ideally, inductive reasoning can be an additional means for learning.

(f) Probability Interpretation Logic 708—provides the logic for probability interpretation typically as applied the degree to which a statement is supported by available evidence. Further, the probability interpretation of this embodiment, in the context of the domain-specific logic 704, may require interpretation through so-called objective probabilities such as found in the behavior of real-world objects like dice, projectiles, and gaming. Bayesian probability and Bayesian inference are significant contributors to this logic subsystem.

(g) Temporal Logic 709—provides the logic needed for reasoning about relationships involving time and is often associated with probability interpretation, such as the statement "the doctor may not have seen the patient before ordering medications." The ability to reason about time-ordering is essential to this invention and accordingly to the embodiment.

(h) Statistical Logic 710—provides classical statistical logic often in the form of algorithms, but also inference rules about the use of statistical methods as well as relationships to probabilities. Thus, statistical inference is a contributor to this logic subsystem.

(i) Metadata Logic 711—provides logic about the elements of data and their relationship. For example, given a patient entity in healthcare, that entity has properties such as gender, height, eye color, treatment doctor, etc. This subsystem is required to be more than the typical data dictionary found in database management systems in that it also must reason about one or more data elements using the abilities of the other logic subsystems in this embodiment. Thus, this subsystem also has rules of behavior associated with the each element of data as well as collections of data.

Figures:

FIG. 1 is a schematic diagram showing a visual representation demonstrating an exemplary monitoring process of the multi-domain system. FIG. 1 includes the following exemplary components and steps:

1. As represented by the numbers "1" in FIG. 1, the MPIF is "hashed" at each subscribing/participating domain (the correlator and reporter module never holds PI, only hashed MPIFs).
2. As represented by the numbers "2" in FIG. 1, the MPIF may be transmitted to the Open Source De-Identification Protocol Manager for secure transmission and security assurance.
3. Individual MPIFs, as represented by the numbers "3" in FIG. 1, are uploaded to the correlator and reporter module.
4. As represented by the number "4" in FIG. 1, the correlator and reporter module compares individual domain MPIFs to MPIFs from each of the monitored domains for matching, proof of fraudulent activity, and/or proof of breach.

Figure 2:
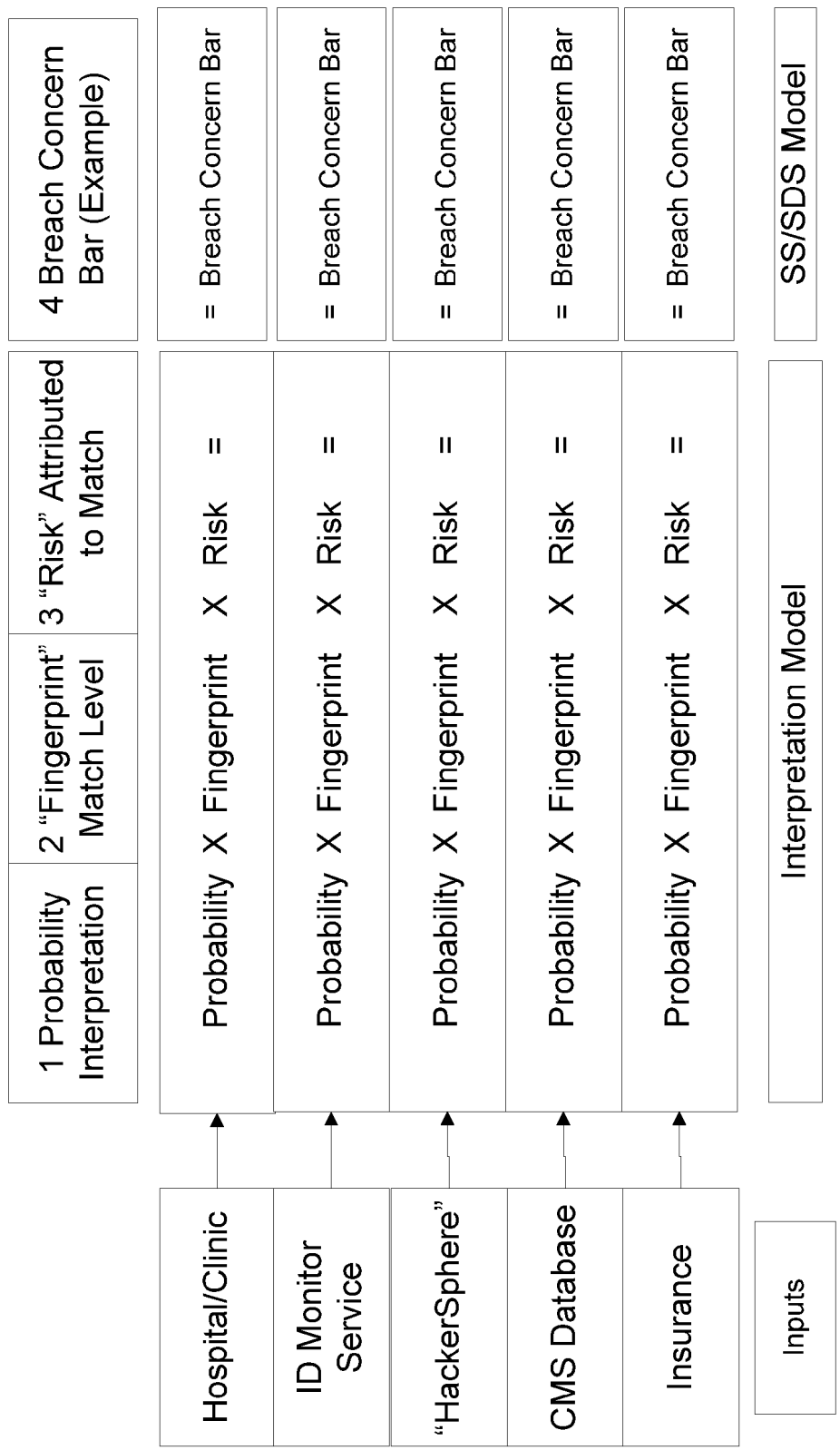
FIG. 2 is a schematic diagram showing the data correlation from the five monitored domains in the Interpretation model and Self Sensitizing/Self-De-Sensitizing (SS/SDS) model and the respective breach concern bars from each of the monitored domains.

FIG. 2 is a schematic diagram showing the data correlation from the five monitored domains in the Interpretation model and Self Sensitizing/Self-De-Sensitizing (SS/SDS) model, and the respective breach concern bars from each of the monitored domains. FIG. 2 includes the following referenced components:

1. MPIFs returned to the correlator and reporter module in FIG. 1 are evaluated in the Interpretation model wherein probability interpretation (represented by the numbers "1"), match correlation (represented by the numbers "2"), and risk assignment functions (represented by the numbers "3") are executed for each domain respectively. Though not diagrammed, the Interpretation model may be aided by AI.
2. The result of each domain's Interpretation model output is integrated with the virtual patterning of the SS/SDS model for generation of the breach concern bar for the respective domain (represented by the numbers "4").
3. The combination of the matches and outputs from each of the individual domains denotes:
   Presence of Breach;
   Type of Breach;
   Presence of fraud; and/or
   Target of fraud.

FIG. 3 is a schematic diagram showing that a correlation of the breach observation line is performed with predicted and previous events to determine whether alert and fraud reporting should be performed. FIG. 3 includes the following referenced components:

1. MPIFs returned to the correlator and reporter module in FIG. 1 are evaluated in the Interpretation model, the output of which informs the sensitivity setting (represented by the number "1") contained within the SS/SDS model (which, in turn, is also contained within the correlator and reporter module).

2. Breach concern bars generated in FIG. 2 are connected with a virtual "breach observation line" (represented by the number "2") at a mathematically predetermined point in order to graphically demonstrate the relationship between individual domains.

3. Breach concern bars and their concomitant breach observation lines are modulated by the sensitivity setting (represented by the number "3") in order that sensitivity may be adjusted. For example, findings consistent with the false positive paradox, and situational variability consistent with false positives or false negatives (as may be determined by including data provided by data handling establishments who have knowledge of specific confounding variables affecting their breach analysis outcomes for the time period in question) may modulate the output of the breach observation line generation step (as represented by the number "2") prior to comparison with predicted and previous events, and completion of any breach alert analysis. The breach observation line is compared with previous "real-life" and virtual scenario breach observation line outcomes to determine if the breach observation line matches archived events (represented by the number "4").

4. Outcome of the breach observation match against archived events is sent to the report engine of the correlator and reporter module for dissemination to the affected domain (if any), or for scheduled update reports regarding the security state of the domains in question (represented by the number "5").

5. For example, in FIG. 3, a match in the Hospital domain and CMS Data Center domain is indicative of a breach. Presence of multiple records in the hackersphere is indicative of a malware-based hack. The presence of few records at the CMS Data Center and Insurance domains in relation to the breach concern line from the other domains becomes more clearly indicative of a malware based attack more focused on "anarchy" than fraud. Where breach concern bars and their concomitant breach observation lines are compared to historic means, further information may be ascertained.

6. Combination of breach concern bars via breach observation lines allows probable determination of:
Type of Breach;
Presence of fraud; and/or
Target of fraud.

FIG. 4 is a schematic diagram showing a visual representation of the correlator and reporter module as it houses and executes multiple modes of operation.

1. The correlator and reporter module houses and executes modes of operation for:
Probability interpretations of data transiting individual domains;
Risk assignment to match levels made in individual domains;
Match correlation to ascertain the match level in individual domains; and
Report engine to report outcome of analysis to end users.

2. The correlator and reporter module may execute match correlation, probability interpretation, and/or risk assignment with a housed AI model.

3. The correlator and reporter module houses the SS/SDS mode that, in turn, executes the virtual patterning mode, and sensitivity mode. The SS/SDS mode may be modulated by input from other modes housed and executed within the correlator and reporter module and/or the AI model.

FIG. 1 is a schematic diagram showing an exemplary monitoring process as it may appear for a data-handling establishment of the multi-domain system. The data-handling establishment may not be a healthcare establishment and, in this exemplary case, the data-handling establishment is shown as a retail sales establishment. FIG. 1 includes the following exemplary components and steps:

1. As represented by the numbers "1" in FIG. 1, the MPIF (now representative of a "master protected index fingerprint") is "hashed" at each subscribing/participating domain.

2. As represented by the numbers "2" in FIG. 1, the MPIF may transit the optional Open Source De-Identification Protocol Manager for secure transmission and security assurance.

3. Individual MPIFs, as represented by the numbers "3" in FIG. 1, are uploaded to the correlator and reporter module.

4. As represented by the number "4" in FIG. 1, the correlator and reporter module compares individual domain MPIFs to MPIFs from each of the monitored domains for matching, proof of fraudulent activity, and/or proof of breach. The correlator and reporter module supplies information to the Interpretation model and SS/SDS model for execution therein as outlined in FIGS. 2-4, the difference being that the domains informing the breach concern bars are now labeled as "retail sector," "ID monitor service," "hackersphere," "financial transaction database," and "social media monitor." One will note that the domains informing various sectors (e.g. healthcare, retail, etc.) may vary depending on the capabilities desired, may increase or decrease depending on the level of service desired, and/or may merge depending on the overlap of sector interests.

Although described herein as a "system" and "method," it should be noted that variations described herein may actually be considered as a plurality of systems and methods. In other words, each variation described herein may be considered a separate system and/or a separate method.

Although described herein in terms of medical applications, it should be noted that systems and methods for detecting data breaches described herein can be used for alternative types of data breaches. In particular, the use of a breach observation line is not limited to medical applications.

It is to be understood that the inventions, examples, and embodiments described herein are not limited to particularly exemplified materials, methods, and/or structures. It is to be understood that the inventions, examples, and embodiments described herein are to be considered preferred inventions, examples, and embodiments whether specifically identified as such or not.

All references (including, but not limited to, publications, patents, and patent applications) cited herein, whether supra or infra, are hereby incorporated by reference in their entirety.

The terms and expressions that have been employed in the foregoing specification are used as terms of description and not of limitation, and are not intended to exclude equivalents of the features shown and described. While the above is a complete description of selected embodiments of the present invention, it is possible to practice the invention use various alternatives, modifications, adaptations, variations, and/or combinations and their equivalents. It will be appreciated by those of ordinary skill in the art that any arrangement that is calculated to achieve the same purpose may be substituted for the specific embodiment shown.

It is also to be understood that the following paragraphs are intended to cover all of the generic and specific features of the invention herein described and all statements of the scope of the invention that, as a matter of language, might be to fall there between.

What is claimed is:

1. A data breach detection and fraud prevention system comprising:
   (a) an Interpretation model to facilitate probability interpretation, risk assignment, and match correlation;
   (b) a self-sensitizing/self de-sensitizing model that executes virtual patterning methods where the virtual patterning methods allow for forensic analysis of breach events;
   (c) a correlator and reporter module comprising a processor, in which said Interpretation model and said self-sensitizing/self de-sensitizing model are executed and correlated, and in which multiple domains are monitored for breach events by measuring a degree of match of predetermined data elements of electronic records against records present in at least one monitored domain, and in which virtual breach concern bars indicating the significance of findings for each monitored domain are generated, and in which said breach concern bars are connected with a virtual line to create a virtual breach observation line; and
   (d) wherein said correlator and reporter module detects data breaches using multiple domain breach event correlations graphically illustrated as said virtual breach observation line connecting said breach concern bars that indicate the significance of findings for each monitored domain.

2. The system of claim 1, wherein said system is used to prevent fraud.

3. The system of claim 1, wherein said system is used to prevent healthcare insurance fraud.

4. The system of claim 1, said correlator and reporter module monitoring at least two domains selected from the group of domains comprising:
   (a) a hospital/clinic domain;
   (b) a hackersphere domain;
   (c) a CMS data center domain;
   (d) an ID Monitoring Service (IDMS) domain; and
   (e) an insurance domain.

5. The system of claim 1, wherein said correlator and reporter module monitors multiple domains for breach events by measuring a degree of match of predetermined data elements of a patient's electronic medical records against records present in at least one monitored domain.

6. A method for data breach detection and fraud prevention system, said method comprising the steps of:
   (a) facilitating probability interpretation, risk assignment, and match correlation using an Interpretation model;
   (b) executing, on a processor, virtual patterning methods where the virtual patterning methods allow for forensic analysis of breach events using a self-sensitizing/self de-sensitizing model;
   (c) executing and correlating, on a processor, said Interpretation model and said self-sensitizing/self de-sensitizing model using a correlator and reporter module;
   (d) monitoring multiple domains using said correlator and reporter module for breach events by measuring a degree of match of predetermined data elements of electronic records against records present in at least one monitored domain;
   (e) generating virtual breach concern bars indicating the significance of findings for each monitored domain;
   (f) connecting said breach concern bars with a virtual line to create a virtual breach observation line; and
   (g) detecting data breaches using multiple domain breach event correlations using said correlator and reporter module.

7. The method of claim 6, said method preventing fraud.

8. The method of claim 6, said method preventing healthcare insurance fraud by providing early detection of Patient Information breach.

9. The method of claim 6, said step of monitoring multiple domains further comprising monitoring at least two domains selected from the group of domains comprising:
   (a) a hospital/clinic domain;
   (b) a hackersphere domain;
   (c) a CMS data center domain;
   (d) an ID Monitoring Service (IDMS) domain; and
   (e) an insurance domain.

10. The method of claim 6, said step of monitoring multiple domains further comprising the step of monitoring multiple domains for breach events by measuring a degree of match of predetermined data elements of a patient's electronic medical records against said records present in at least one monitored domain.

11. The method of claim 6, using said virtual breach observation line, graphically illustrating a correlation of various domains.

12. The method of claim 6, said step of connecting said breach concern bars with a virtual line to create a virtual breach observation line further comprising the
   step of connecting said breach concern bars with said virtual line at normalized mid-points of said breach concern bars to create said virtual breach observation line.

13. A method for data breach detection and fraud prevention system, said method comprising the steps of:
   (a) facilitating probability interpretation, risk assignment, and match correlation using an Interpretation model;
   (b) executing, on a processor, virtual patterning methods where the virtual patterning methods allow for forensic analysis of breach events using a self-sensitizing/self de-sensitizing model;
   (c) executing and correlating, on a processor, said Interpretation model and said self-sensitizing/self de-sensitizing model using a correlator and reporter module;
   (d) monitoring multiple domains for breach events by measuring a degree of match of predetermined data elements of a patient's electronic medical records against records present in at least one monitored domain;
   (e) using at least one breach observation line, graphically illustrating a correlation of various domains;
   (f) generating virtual breach concern bars indicating the significance of findings for each monitored domain;
   (g) connecting said breach concern bars with at least one virtual line to create said at least one breach observation line; and
   (h) said method preventing healthcare insurance fraud by providing early detection of Patient Information breach.

14. The method of claim 13, said step of monitoring multiple domains further comprising monitoring at least two domains selected from the group of domains comprising:
   (a) a hospital/clinic domain;
   (b) a hackersphere domain;
   (c) a CMS data center domain;
   (d) an ID Monitoring Service (IDMS) domain; and
   (e) an insurance domain.

15. The method of claim 13, said step of connecting said breach concern bars with at least one virtual line to create said at least one breach observation line further comprising the step of connecting said breach concern bars with said at least one virtual line at normalized mid-points of said breach concern bars to create said at least one breach observation line.

* * * * *